(12) United States Patent
Nagata et al.

(10) Patent No.: US 9,356,754 B2
(45) Date of Patent: *May 31, 2016

(54) RADIO COMMUNICATION SYSTEM, BASE STATION APPARATUS, MOBILE TERMINAL APPARATUS, AND INTERFERENCE MEASUREMENT METHOD

(71) Applicant: NTT DOCOMO, INC., Tokyo (JP)

(72) Inventors: Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/426,337

(22) PCT Filed: Jul. 12, 2013

(86) PCT No.: PCT/JP2013/069204

§ 371 (c)(1),
(2) Date: Mar. 5, 2015

(87) PCT Pub. No.: WO2014/041888

PCT Pub. Date: Mar. 20, 2014

(65) Prior Publication Data

US 2015/0229452 A1 Aug. 13, 2015

(30) Foreign Application Priority Data

Sep. 11, 2012 (JP) ................. 2012-199396

(51) Int. Cl.
*H04L 5/00* (2006.01)
*H04W 24/10* (2009.01)
*H04L 27/26* (2006.01)

(52) U.S. Cl.
CPC ............ *H04L 5/0048* (2013.01); *H04L 5/0051* (2013.01); *H04L 5/0073* (2013.01); *H04W 24/10* (2013.01); *H04L 5/0023* (2013.01); *H04L 27/2636* (2013.01)

(58) Field of Classification Search
None
See application file for complete search history.

(56) References Cited

U.S. PATENT DOCUMENTS

| | | | |
|---|---|---|---|
| 8,897,182 B2 | 11/2014 | Yoon et al. | |
| 2010/0238818 A1* | 9/2010 | Takaoka et al. | 370/252 |
| 2011/0007657 A1* | 1/2011 | Kazmi et al. | 370/252 |
| 2011/0292903 A1* | 12/2011 | Jongren et al. | 370/329 |
| 2012/0213261 A1* | 8/2012 | Sayana et al. | 375/224 |

(Continued)

FOREIGN PATENT DOCUMENTS

| | | |
|---|---|---|
| JP | 2012-514443 A | 6/2012 |
| WO | 2012/021018 A2 | 2/2012 |

OTHER PUBLICATIONS

International Search Report issued in PCT/JP2013/069204 mailed on Sep. 10, 2013 (2 pages).

(Continued)

*Primary Examiner* — Phuc Tran
*Assistant Examiner* — Shick Hom
(74) *Attorney, Agent, or Firm* — Osha Liang LLP

(57) ABSTRACT

The present invention is designed to increase the number of CSI-RSs for interference measurements and improve the accuracy of interference measurements. The first reference signal is allocated to a reference signal resource defined for transmission of the first reference signal, and also a second reference signal for interference measurement is allocated, the allocation patterns of the first reference signal and the second reference signal are implicitly reported to the first mobile terminal to apparatus that supports both the first reference signal and the second reference signal, and, in the first mobile terminal apparatus, interference is measured using both the first reference signal and the second reference signal or using the second reference signal alone, based on the implicitly-reported allocation patterns.

8 Claims, 18 Drawing Sheets

(56) References Cited

U.S. PATENT DOCUMENTS

2013/0094411 A1    4/2013  Zhang
2013/0208677 A1*  8/2013  Lee et al. ............... 370/329
2014/0307576 A1*  10/2014  Nagata et al. ........... 370/252

OTHER PUBLICATIONS

NTT DOCOMO; "Enhanced Interference Measurement Mechanism for Rel-11"; 3GPP TSG RAN WG1 Meeting #68; R1-120405; Dresden, Germany; Feb. 6-10, 2012 (6 pages).

NTT DOCOMO; "Enhanced Interference Measurement Mechanism for Rel-11"; 3GPP TSG RAN WG1 Meeting #67; R1-114076; San Francisco, USA; Nov. 14-18, 2011 (5 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

* cited by examiner

RADIO COMMUNICATION SYSTEM, BASE STATION APPARATUS, MOBILE TERMINAL APPARATUS, AND INTERFERENCE MEASUREMENT METHOD

TECHNICAL FIELD

The present invention relates to a radio communication system, a base station apparatus, a mobile terminal apparatus, and an interference measurement method in a next-generation mobile communication system.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, LTE (Long-Term Evolution) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. In an LTE system, it is possible to achieve a transmission rate of about maximum 300 Mbps on the downlink and about 75 Mbps on the uplink by using a variable band which ranges from 1.4 MHz to 20 MHz. With the UMTS network, successor systems of the LTE system are also under study for the purpose of achieving further broadbandization and higher speed (referred to as, for example, "LTE-advanced" or "LTE-enhancement" (hereinafter referred to as "LTE-A")).

In the downlink of the LTE system (for example, Rel. 8), CRSs (Cell-specific Reference Signals), which are associated with cell IDs, are defined. These CRSs are used to demodulate user data, and, in addition, used to measure downlink channel quality (CQI: Channel Quality Indicator) for scheduling and adaptive control, and so on. In the downlink of successor systems of LTE (for example, Rel. 10), CSI-RSs (Channel State Information-Reference Signals) are under study for dedicated use for CSI (Channel State Information) measurements.

CITATION LIST

Non-Patent Literature

Non-Patent Literature 1: 3GPP, TR25.912 (V7.1.0), "Feasibility Study for Evolved UTRA and UTRAN," September 2006

SUMMARY OF THE INVENTION

Technical Problem

When CQIs are measured on the mobile terminal apparatus side, the accuracy of interference measurements is important. In the LTE system, interference is measured using CRSs that are linked with cell IDs. However, when a system configuration is employed in which the same cell ID is assigned to a plurality of transmission points, there is a problem that CRSs that are transmitted simultaneously from a plurality of transmission points where the same cell ID is assigned cannot be separated in a user terminal. In LTE-A (Rel. 10), CSI-RSs, which are defined for signal component measurements of received signals (desired waves), can be separated even in a system configuration in which the same cell ID is assigned to a plurality of transmission points. However, when interference is measured using CSI-RSs, since the density of CSI-RSs is low, it is difficult to measure interference with high accuracy.

The present invention has been made in view of the above, and it is therefore an object of the present invention to provide a radio communication system, a base station apparatus, a mobile terminal apparatus and an interference measurement method, whereby interference can be measured with high accuracy in future systems that do not rely on CRSs.

Solution to Problem

The radio communication system of the present invention is a radio communication system which has a plurality of base station apparatuses that transmit a first reference signal for channel state measurement, and a first mobile terminal apparatus and a second mobile terminals that each connect with one of the plurality of base station apparatuses, and in which each base station apparatus comprises a reference signal allocation section that allocates the first reference signal to a reference signal resource defined for transmission of the first reference signal and also allocates a second reference signal for interference measurement, and implicitly reports allocation patterns of the first reference signal and the second reference signal to the first mobile terminal apparatus that supports both the first reference signal and the second reference signal, and the mobile terminal apparatus comprises an interference measurement section that measures interference using both the first reference signal and the second reference signal or using the second reference signal alone, based on the allocation patterns reported implicitly from the base station apparatus.

Technical Advantage of the Invention

According to the present invention, it is possible to allocate first reference signals, to reference signal resources that are defined for first reference signal transmission, and furthermore allocate interference measurement second reference signals, so that it is possible to increase the density of interference measurement reference signals in channel state measurement reference signal resources, and measure interference from other transmission points with high accuracy.

DESCRIPTION OF EMBODIMENTS

First, CSI-RSs, which are one kind of reference signals employed in successor systems of LTE (for example, Rel. 10), will be described with reference to FIG. 1. CSI-RSs are reference signals that are used to measure CSI such as CQIs (Channel Quality Indicators), PMIs (Precoding Matrix Indicators), RIs (Rank Indicators) and so on, as channel states. Unlike CRSs that are allocated to all subframes, CSI-RSs are allocated in a predetermined cycle—for example, in a ten-subframe cycle. CSI-RSs are specified by parameters such as positions, sequences and transmission power. The positions of CSI-RSs include subframe offset, cycle, and subcarrier-symbol offset (index).

As CSI-RSs, non-zero-power CSI-RSs and zero-power CSI-RSs are defined. With non-zero-power CSI-RSs, transmission power is distributed to the resources where the CSI-RSs are allocated, while, with zero-power CSI-RSs, transmission power is not distributed to the resources where the CSI-RSs are allocated (that is, the CSI-RSs are muted).

In one resource block defined in LTE, CSI-RSs are allocated not to overlap with control signals such as the PDCCH (Physical Downlink Control Channel), user data such as the PDSCH (Physical Downlink Shared Channel), and other reference signals such as CRSs (Cell-specific Reference Signals) and DM-RSs (Demodulation-Reference Signals). One resource block is formed with twelve subcarriers that are consecutive in the frequency direction and fourteen symbols that are consecutive in the time axis direction. As for resources where CSI-RSs can be allocated, two resource elements that neighbor each other in the time axis direction are allocated in sets, from the perspective of suppressing the PAPR.

In the CSI-RS placement configurations shown in FIG. 1, forty resource elements are secured in one resource block as CSI-RS resources (reference signal resources). CSI-RS patterns are set in these forty resource elements, in accordance with the number of CSI-RS ports (the number of antennas and so on). In each CSI-RS pattern, one resource element is allocated for a CSI-RS, for every one CSI-RS port.

When the number of CSI-RS ports is two, CSI-RSs are allocated to two resource elements among forty resource elements. Consequently, in FIG. 1A, twenty CSI-RS patterns that are designated by indices #0 to #19 (CSI configurations=0 to 19) are set. Here, for ease of explanation, resource elements that constitute one same pattern are assigned the same index.

When the number of CSI-RS ports is four, CSI-RSs are allocated to four resource elements among forty resource elements. Consequently, in FIG. 1B, ten CSI-RS patterns, designated by indices #0 to #9 (CSI configurations=0 to 9), are set. Note that, in the CSI-RS patterns, user data and/or the like are allocated to the resource elements where CSI-RSs are not allocated.

Figure 1A:
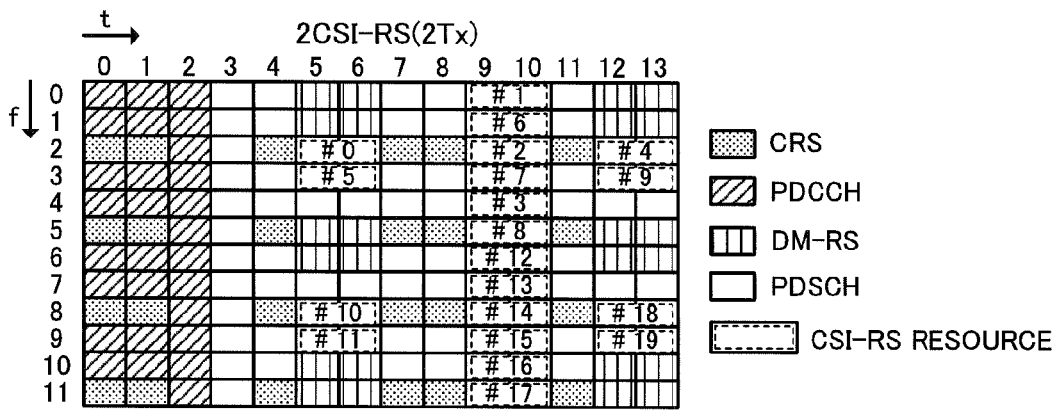
FIG. 1 provides diagrams to explain CSI-RS allocation patterns in resource blocks.
Figure 1B:
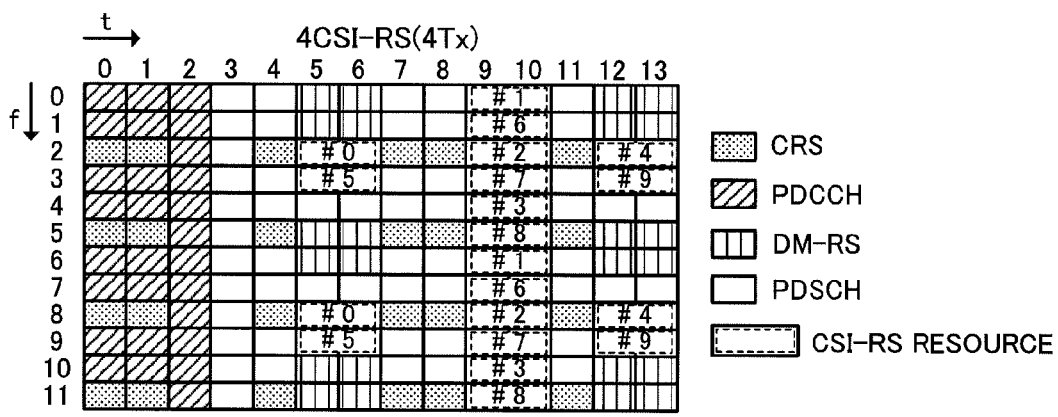
Figure 1C:
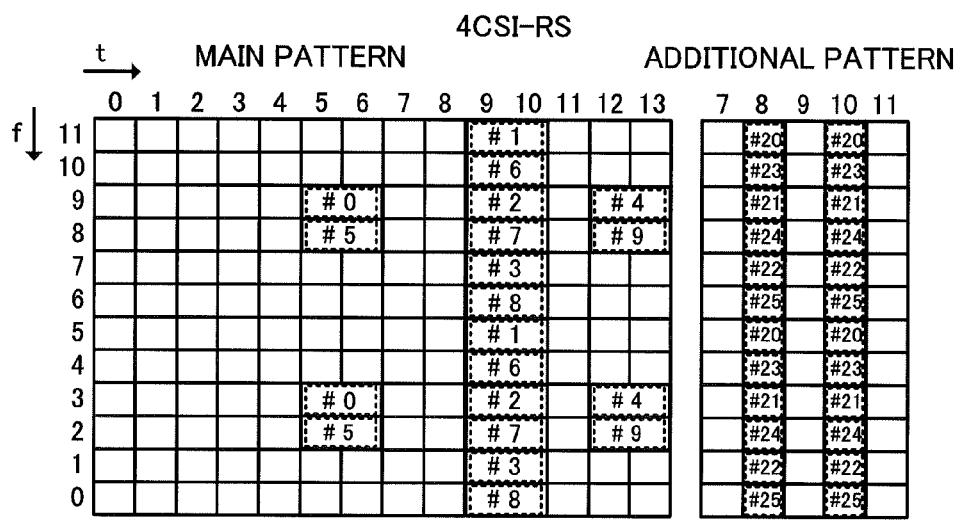

The CSI-RSs are prevented from causing interference between cells, by selecting different CSI-RS patterns (CSI configurations) on a per cell basis. As for the CSI-RS patterns, besides the FDD normal patterns shown in FIGS. 1A and 1B, TDD additional patterns may be added as an option to FDD, as shown in FIG. 1C. Extended patterns (not shown), which are extended FDD normal patterns, may be used as well. CSI-RS patterns in which the number of CSI-RS ports is eight may be used. In the following description, examples with FDD normal patterns will be described for ease of explanation.

Figure 2A:
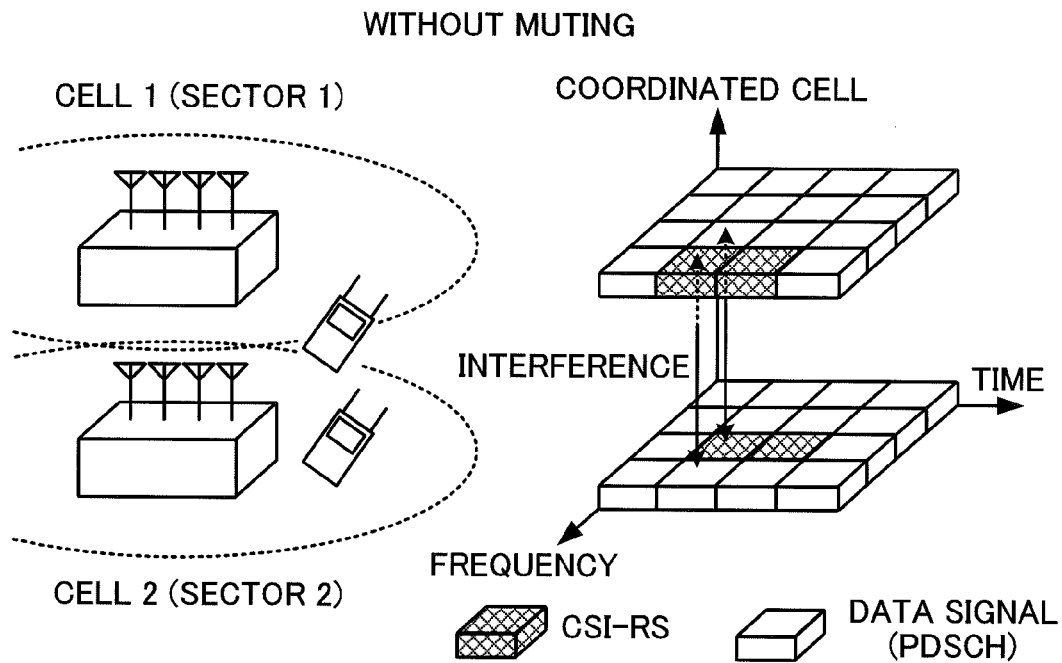
FIG. 2 provides diagrams to explain muting in CQI measurements using CSI-RSs.

In CSI measurements using these CSI-RSs, cases might occur where the accuracy of measurements is damaged by interference from neighboring cells. For example, as shown in FIG. 2A, user data is allocated to downlink resource blocks of a cell C1 that correspond to a CSI-RS in a neighboring cell C2. User data is allocated to downlink resource blocks of the cell C2 that correspond to a CSI-RS in the neighboring cell C1. Such user data constitutes interference components against the CSI-RS in each cell, and becomes a factor to damage the accuracy of CSI measurements in mobile terminal apparatuses that are located in the border between the cell C1 and the cell C2.

Figure 2B:
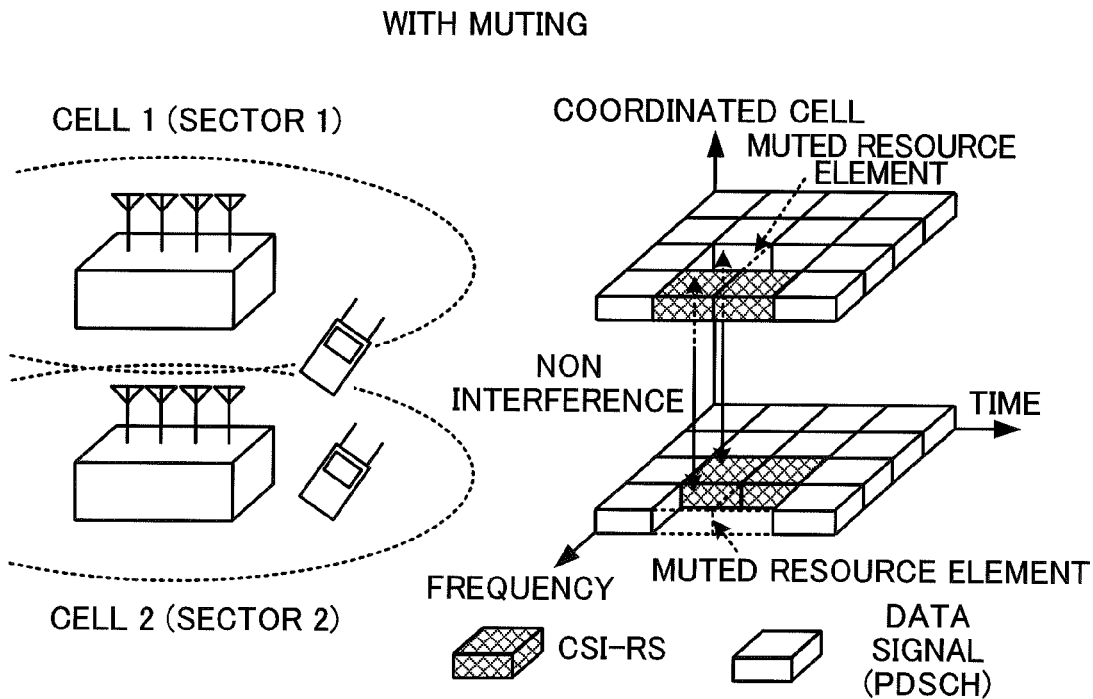

To improve the deterioration of the accuracy of CSI measurements due to the positions where user data is allocated, muting can be applied. In muting, user data is not allocated to resources that correspond to CSI-RSs in neighboring cells, as shown in FIG. 2B. The downlink resource blocks of the cell C1 that correspond to the CSI-RS of the cell C2 are muted. The downlink resource blocks of cell C2 that correspond to the CSI-RS of cell C1 are muted. By means of this configuration, the accuracy of CSI measurements in mobile terminal apparatuses is improved by eliminating interference components against CSI-RSs due to neighboring cells' user data. Apart from the above purpose, the present invention executes muting in order to mask additional CSI-RSs from conventional terminals.

Although the resources to be muted are resources with zero transmission power, they may be as well defined as resources where no data is allocated. Muted resources may be defined as resources where data is allocated only to such an extent that no interference is caused against the CSI-RSs of neighboring cells. Depending on cases, muted resources may also be defined as resources that are transmitted with such transmission power that no interference is caused against the CSI-RSs of neighboring cells.

When CQIs are calculated based on CSI-RSs, the accuracy of interference measurements becomes important. Use of CSI-RSs, which are user-specific reference signals, allows a user terminal to separate between CSI-RSs from a plurality of transmission points, so that interference measurements based on CSI-RSs are promising. However, given that the density of CSI-RSs in one resource block as defined in LTE (Rel. 10) is low, it is difficult to measure interference from other transmission points (other cells) with high accuracy.

According to a first aspect of the present invention, interference from other transmission points is measured using high-density CSI-RSs, with which the density of CSI-RSs in CSI-RS transmission resources is made higher than the density of CSI-RSs defined in LTE (Rel. 10) (hereinafter referred to as "conventional CSI-RSs").

By this means, it is possible to measure interference from transmission points apart from the transmission point where a user terminal is connected, with high accuracy. CSI can be determined using high-density CSI-RSs, so that it is possible to improve the accuracy of CSI. According to the first aspect of the present invention, it is possible to improve both the accuracy of interference measurements and the accuracy of signal estimation.

In downlink communication with user terminals that support conventional CSI-RSs of LTE (Rel. 10) yet do not support high-density CSI-RSs (hereinafter referred to as "conventional terminals (Rel. 10)"), it is preferable to allocate zero-power CSI-RSs to the resources of additional CSI-RSs (CSI-RSs that are provided in addition to fixed patterns of CSI-RSs defined in Rel. 10).

By this means, conventional terminals (Rel. 10) can identify unsupported additional CSI-RSs as zero-power CSI-RSs, and carry out data demodulation by excluding the additional CSI-RS resources.

Figure 3:
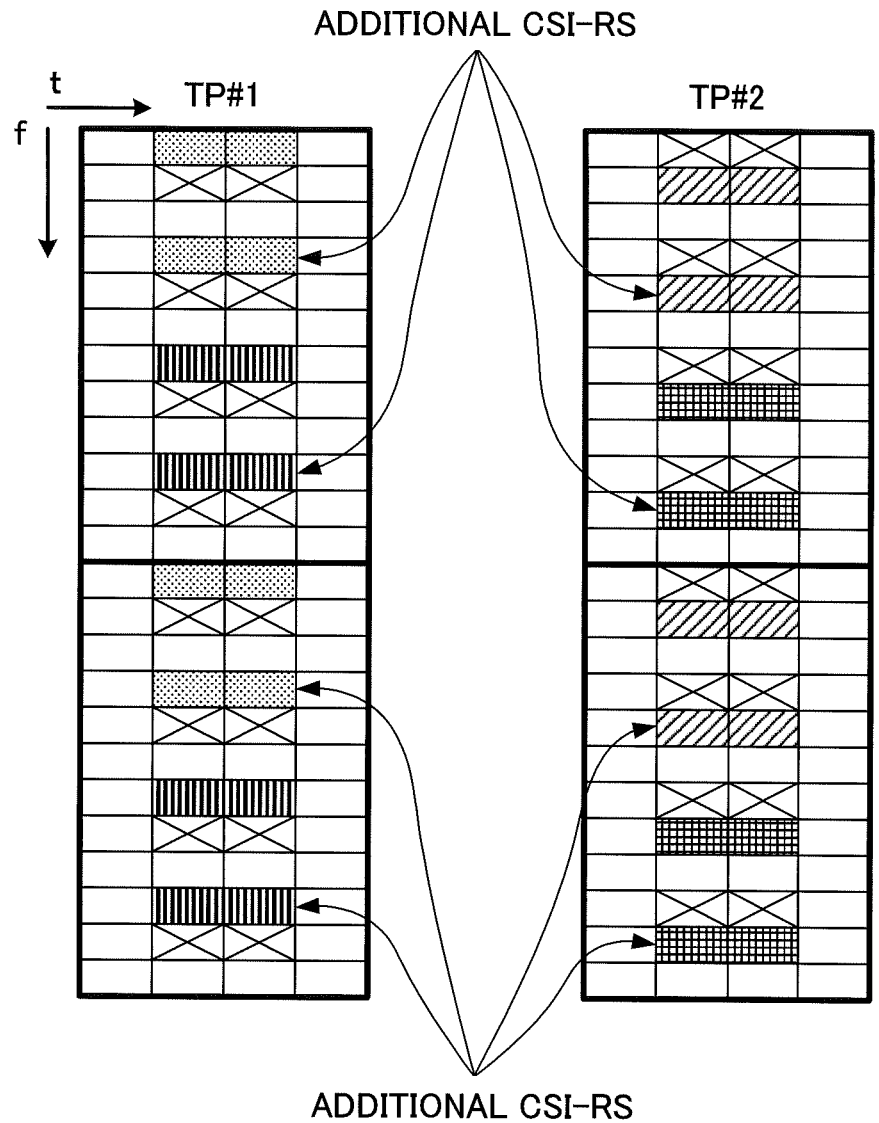
FIG. 3 is a diagram to show high-density CSI-RS patterns.
Figures 4A, 4B:
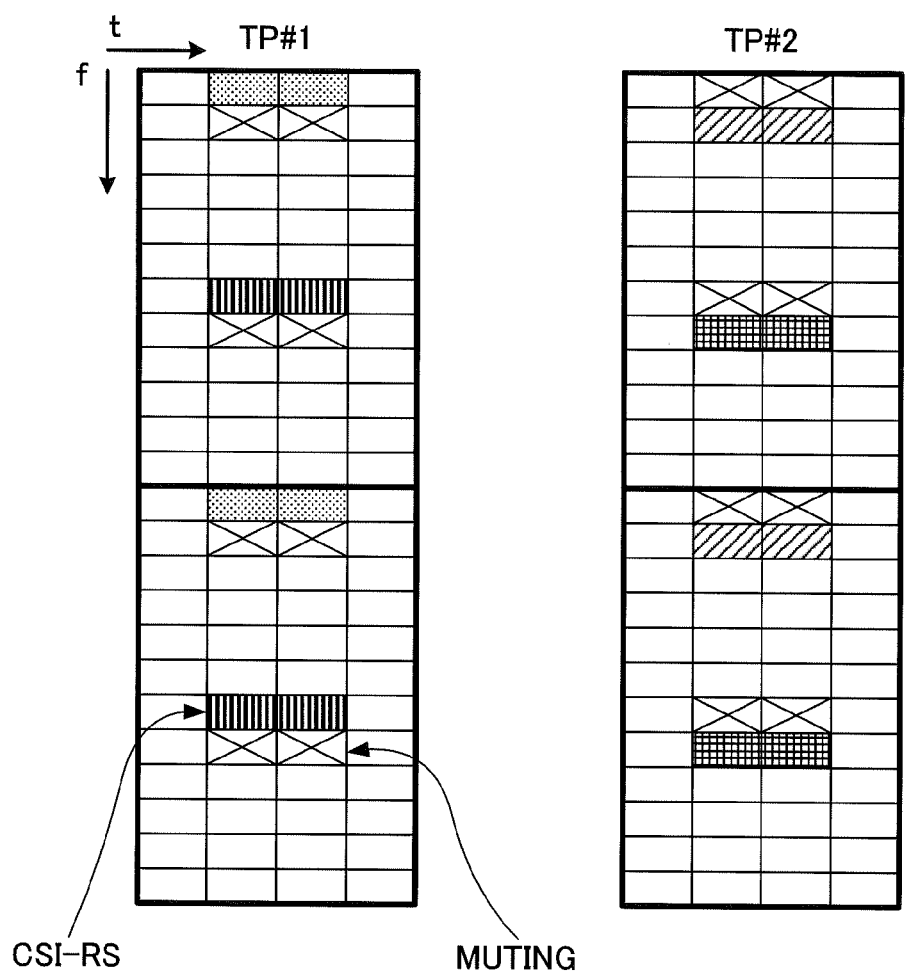
FIG. 4 provides diagrams to show conventional CSI-RS patterns.

Here, an interference measurement method based on high-density CSI-RSs will be described. A system configuration, in which a plurality of radio base stations assigned different cell IDs or the same cell ID serve as transmission points, will be described below as an example. FIG. 3 shows an example of high-density CSI-RSs, where two resource blocks of the eighth, ninth, tenth and eleventh symbols shown in FIG. 1A are taken out. Note that FIG. 4B shows a situation where, for ease of explanation, the resource elements constituting CSI-RS resources in one resource block are numbered. In the following description, to specify CSI-RS resources in one resource block, the resource numbers shown in FIG. 4B are used when appropriate.

FIG. 3 shows the high-density CSI-RS patterns applied to transmission points TP #1 and TP #2. In one resource block, as high-density CSI-RSs to be applied to transmission point TP #1, CSI-RSs (non-zero-power CSI-RSs) are placed in resource elements (1, 2), (7, 8), (13, 14) and (19, 20), and zero-power CSI-RSs are placed in resource elements (3, 4), (9, 10), (15, 16) and (21, 22). As obvious from a comparison with the conventional CSI-RS patterns in transmission point TP #1 shown in FIG. 4A, the high-density CSI-RSs are placed at a density that is twice as high as that of the fixed patterns of conventional CSI-RSs (for example, for two antenna ports) shown in FIG. 4A.

As for the high-density CSI-RSs for transmission point TP #2 shown in FIG. 3, in one resource block, CSI-RSs (non-zero-power CSI-RSs) are placed in resource elements (3, 4), (9, 10), (15, 16) and (21, 22), and zero-power CSI-RSs are placed in resource elements (1, 2), (7, 8), (13, 14) and (19, 20).

In the example shown in FIG. 3, the high-density CSI-RSs are orthogonalized in the time/frequency domain between transmission point TP #1 and transmission point TP #2.

The radio base station (TP #1) to constitute transmission point #1 reports configuration information of the high-density CSI-RSs shown in FIG. 3, to terminals that support the high-density CSI-RSs (hereinafter referred to as "support terminals") among the user terminals connected to TP #1, through higher layer signaling, and, to the conventional terminals (Rel. 10), reports configuration information of the CSI-RSs shown in FIG. 4 through higher layer signaling, and furthermore, regarding the additional CSI-RS resources, reports configuration information of the zero-power CSI-RSs through higher layer signaling.

The support terminals, to which the high-density CSI-RSs are reported, determine CSI by way of channel state measurements using all the high-density CSI-RSs transmitted from the connecting transmission point, and measures interference in the high-density CSI-RS resources, using high-density CSI-RSs transmitted from other transmission points. Note that, in the example shown in FIG. 3, the same resource as the CSI-RS resources of TP #1 are muted in TP #2, so that it is possible to measure interference from transmission points other than TP #2. In this way, the number of CSI-RSs to be used in channel state measurements and interference measurements increases, so that it is possible to improve the accuracy of both channel state measurements and interference measurements.

The conventional terminals (Rel. 10) recognize that zero-power CSI-RSs are set in the additional CSI-RS resources, and exclude these resources from demodulation.

As shown in FIG. 3, when high-density CSI-RSs are completely orthogonalized in the time/frequency domain between transmission point TP #1 and transmission point TP #2, user terminals that are connected to transmission point #1 can carry out channel state measurements with respect to CSI-RS signal components, without receiving interference from the other transmission point #2.

According to a second aspect of the present invention, in order to make the density of CSI-RSs in one resource block higher than the density defined in LTE (Rel. 10), CSI-RS patterns to add interference measurement-only CSI-RSs, which are CSI-RSs for dedicated use in interference measurements, are applied, and a user terminals measure interference from other transmission points using the interference measurement-only CSI-RSs.

By this means, interference can be measured using conventional CSI-RSs and interference measurement-only CSI-RSs, so that it is possible to increase the number of interference measurement reference signals, and improve the accuracy of interference measurements. Unlike conventional CSI-RSs, the interference measurement-only CSI-RSs can be placed freely in resources that do not overlap with conventional CSI-RSs, unless used in channel state measurements.

Figure 5:
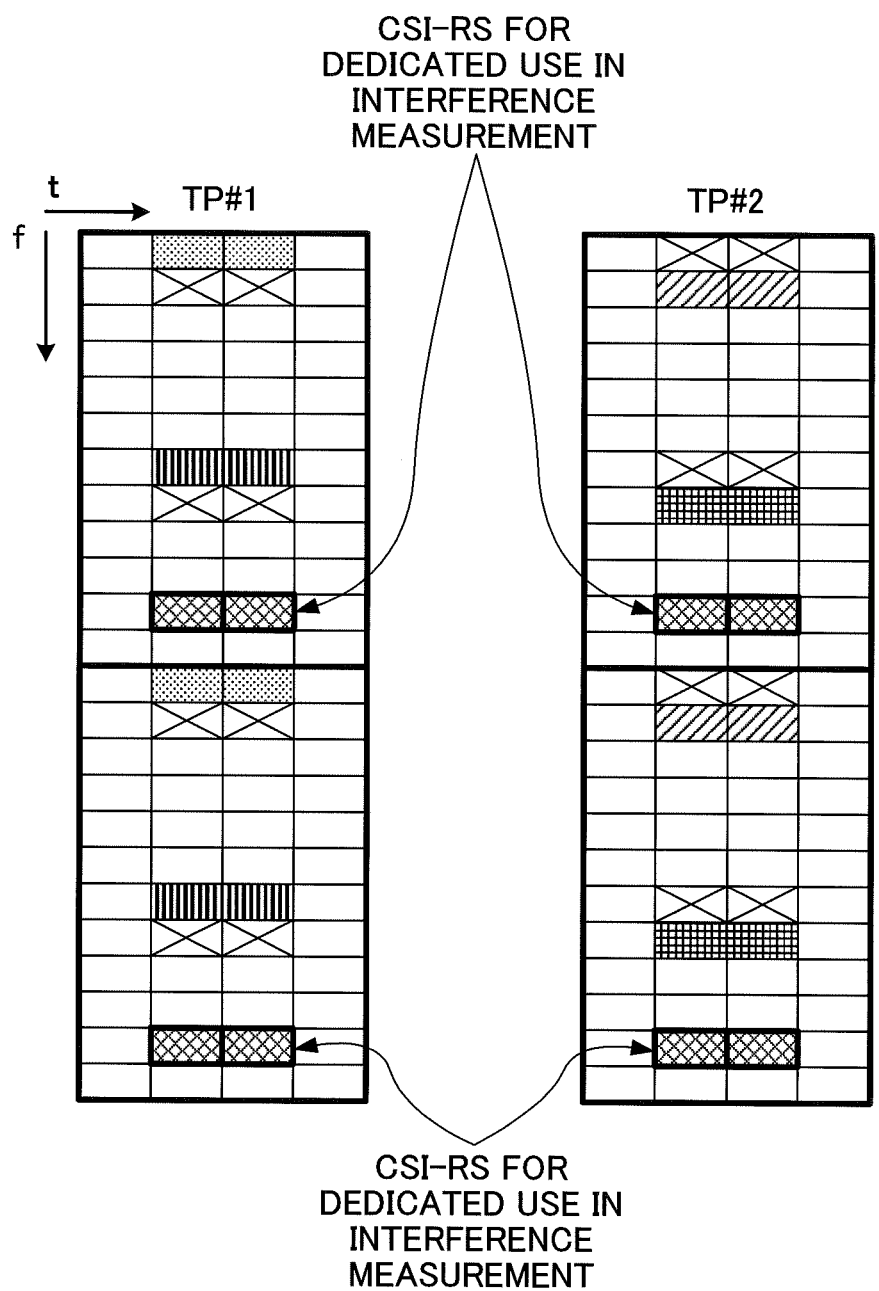
FIG. 5 is a diagram to show CSI-RS patterns including interference measurement-only CSI-RSs.

Now, an interference measurement method using interference measurement-only CSI-RSs will be described. As has been described above, a system configuration in which two radio base stations serve as transmission points TP #1 and TP #2 will be described as an example. FIG. 5 shows an example of CSI-RS patterns in which interference measurement-only CSI-RSs are additionally placed, where two resource blocks of the eighth, ninth, tenth and eleventh symbols shown in FIG. 1A are taken out.

In one resource block, transmission point TP #1 places interference measurement-only CSI-RSs in resources (21, 22) that do not overlap with conventional CSI-RSs (1, 2) and (13, 14). The interference measurement-only CSI-RSs are not used in channel state measurements unlike the conventional CSI-RSs, and therefore can be placed freely in resources that do not overlap with the conventional CSI-RSs. Transmission point TP #2 places, in one resource block, interference measurement-only CSI-RSs in resources (21, 22) that do not overlap with conventional CSI-RS resources (3, 4) and (15, 16).

In the example shown in FIG. 5, the interference measurement-only CSI-RSs are placed in the same resources (21, 22) between transmission point TP #1 and transmission point TP #2. If signal sequences of the interference measurement-only CSI-RSs are generated using different scrambling sequences between different transmission points or user terminals, a user terminal can execute code-demultiplexing even when interference measurement-only CSI-RSs from multiple transmission points TP #1 and TP #2 are combined. It is equally possible to apply shifts along the frequency axis direction so that interference measurement-only CSI-RS resources do not overlap between the transmission points. In this case, by changing the number of shifts (the number of resource elements) of interference measurement-only CSI-RSs, it is possible to prevent the patterns of interference measurement-only CSI-RSs from overlapping between neighboring transmission points.

In this way, interference measurement-only CSI-RSs are placed in the same resources between multiple transmission points TP #1 and TP #2, and each transmission point transmits interference measurement-only CSI-RSs by way of one-antenna port transmission, so that it is possible to reduce the overhead of signaling. However, the present invention is by no means limited to the case of placing interference measurement-only CSI-RSs in the same resources between transmission points. The present invention is by no means limited to the case where interference measurement-only CSI-RSs are transmitted in one-antenna port transmission. Upon estimating interference, it is equally possible to use conventional CSI-RSs, in addition to interference measurement-only CSI-RSs.

The resources of the interference measurement-only CSI-RSs are sent to conventional terminals (Rel. 10), as zero-power CSI-RSs, through higher layer signaling.

The radio base station (TP #1) to constitute transmission point #1 implicitly reports configuration information of the interference measurement-only CSI-RSs shown in FIG. 5 to support terminals that support the interference measurement-only CSI-RSs among the user terminals connected to TP #1, and, to the conventional terminals (Rel. 10), implicitly reports configuration information of the conventional CSI-RSs shown in FIG. 4, and furthermore implicitly reports the resources (21, 22) of the interference measurement-only CSI-RSs as zero-power CSI-RSs. Here, to "report implicitly" means associating interference measurement-only CSI-RS configuration information (allocation patterns and so on), CSI-RS configuration information (allocation patterns and so on), and interference measurement-only CSI-RS resources (zero-power CSI-RSs) (information related to CSI-RSs), with information to be reported from the radio base station to the support terminals, and reporting these pieces of information, so that information related to CSI-RSs is reported "implicitly." In this case, the information to be associated with the information related to CSI-RSs may be cell IDs, parameters that are used to generate scrambling sequences of reference signals (DM-RSs, CSI-RSs, SRSs (Sounding Reference Signals), PRSs (Positioning Reference Signals) or CRSs (Cell-specific Reference Signals)), user IDs (or user group IDs), parameters that are used to generate DISCOVERY SIGNAL sequences, parameters that are used to generate synchronization signal (PSS and SSS) sequences, the multiplexing positions of the resources of interference measurement-only CSI-RSs, reference signals (DM-RSs, CSI-RSs, SRSs, PRSs, or CRSs), synchronization signals, and so on. Here, the DISCOVERY SIGNALS refer to, for example, signals with which the transmission cycle is set to be longer than the synchronization signals (PSS and SSS) and the amount of radio resources per transmission unit is set to be larger than the synchronization signals, signals which are the same signal sequences as the PSS and SSS and which are multiplexed in different positions along the time/frequency direction, and so on. The reference signals here include signals such as DM-RSs, CSI-RSs, SRSs, PRSs, or part of CRSs. The parameters related to reference signals are not particularly limited, and, for example, CRSs having different transmission cycles (for example, a 5-msec cycle) from conventional ones may be included as CRSs, or CRSs with which the number of antenna ports is limited may be included as CRSs as well.

For example, when reporting information related to CSI-RSs to support terminals, it is possible to associate the information related to CSI-RSs with a parameter X that is used to generate the CSI-RS scrambling sequence shown in following equation 1 or a parameter X that is used to generate the DM-RS scrambling sequence shown in following equation 2, in advance, so that, by sending X through higher layer signaling, the information related to CSI-RSs is reported implicitly.

[Formula 1]

$$c_{init}=2^{10}\cdot(7\cdot(n_1+1)+l+1)\cdot(2\cdot X+1)+2\cdot X+N_{CP} \quad \text{(Equation 1)}$$

[Formula 2]

$$c_{init}=(\lfloor n_3/2 \rfloor+1)\cdot(2X+1)\cdot 2^{15}+n_{SCID} \quad \text{(Equation 2)}$$

In response to the implicit reporting of interference measurement-only CSI-RSs, the support terminals specify and receive the interference measurement-only CSI-RS resources, measure interference using both the interference measurement-only CSI-RSs and conventional CSI-RSs or using the interference measurement-only CSI-RS resources alone, and measure channel states using the conventional CSI-RSs. When interference is measured using the conventional CSI-RSs, the CSI-RSs transmitted from the connecting transmission point TP #1 and the CSI-RSs from other transmission points (transmission points other than TP #2 in FIG. 5) are separated, and interference is measured.

The resources (21, 22) of the interference measurement-only CSI-RSs are reported to the conventional terminals (Rel. 10) as zero-power CSI-RSs. As a result of this, the resources where the interference measurement-only CSI-RSs are placed are recognized as zero-power CSI-RSs, and the interference measurement-only CSI-RS resources are excluded from data demodulation.

According to a third aspect of the present invention, in order to make the density of CSI-RSs to use in interference measurements in one resource higher than the density of CSI-RSs defined in LTE (Rel. 10), patterns in which zero-power CSI-RSs that are used in interference measurements alone (hereinafter referred to as "interference measurement zero-power CSI-RSs") are added is applied, and shifts are applied along the frequency axis direction so that the resources of interference measurement zero-power CSI-RS do not overlap between transmission points. By changing the number of shifts (the number of resource elements) of interference measurement zero-power CSI-RSs, it is possible to prevent the patterns of interference estimation zero-power CSI-RSs from overlapping between neighboring transmission points. To every transmission point or to every plurality of transmission points, different interference measurement zero power CSI-RS patterns are assigned.

By this means, it is possible to measure interference using both non-zero-power CSI-RSs (conventional CSI-RSs with transmission power) and interference measurement zero-power CSI-RSs, increase the number of CSI-RSs that can be used in interference measurements, and improve the accuracy of interference measurements. Since the interference measurement zero-power CSI-RSs have zero transmission power, signal components that are received in the resources where the interference measurement zero power CSI-RSs are allocated can be handled as interference components on an as-is basis, so that it is possible to reduce the processing load for interference measurements.

Here, an interference measurement method using interference measurement zero-power CSI-RSs will be described. A system configuration in which two radio base stations serve as transmission points TP #1 and TP #2 will be described as an example.

Figure 6:
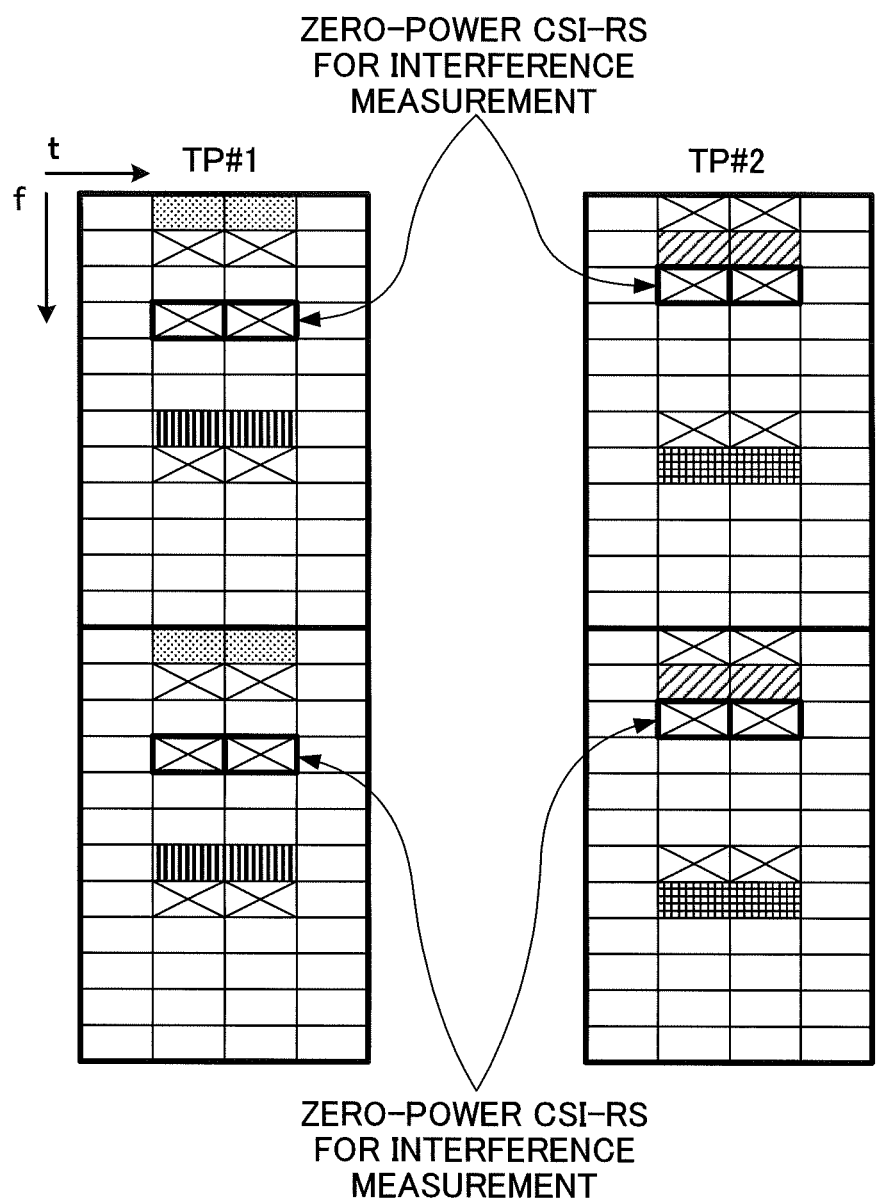
FIG. 6 is a diagram to show CSI-RS patterns including interference measurement zero-power CSI-RSs.

FIG. 6 shows examples of CSI-RS patterns in which interference measurement zero-power CSI-RSs are additionally placed, where two resource blocks of the eighth, ninth, tenth and eleventh symbols shown in FIG. 1A are taken out.

In one resource block, transmission point TP #1 places interference measurement zero-power CSI-RSs in resources (7, 8) that do not overlap with conventional CSI-RSs (1, 2) and (13, 14) in accordance with pattern 1. Based on the conventional CSI-RS patterns, the interference measurement zero-power CSI-RS are allocated to the resource elements of two symbols that have the same frequency and that are consecutive.

In one resource block, transmission point TP #2 places interference measurement zero-power CSI-RSs in resources (5, 6) that do not overlap with conventional CSI-RSs (3, 4) and (15, 16) in accordance with pattern 2.

Pattern 1 and pattern 2 are arbitrary patterns that are selected from a plurality of patterns and adjusted so that interference measurement zero-power CSI-RSs do not overlap. By changing the number of shifts (the number of resource elements) of interference measurement zero-power CSI-RSs along the frequency direction, it is possible to generate patterns in which the interference measurement zero-power CSI-RSs become orthogonal in the time/frequency domain.

The radio base station (TP #1) to constitute transmission point #1 implicitly reports configuration information of the interference measurement zero-power CSI-RSs shown in FIG. 6 to support terminals that support the interference measurement zero-power CSI-RSs among the user terminals connected to TP #1, and, to conventional terminals (Rel. 10), implicitly reports configuration information of the conventional CSI-RSs shown in FIG. 4 and furthermore implicitly reports the resources of the interference measurement zero-power CSI-RSs as zero-power CSI-RSs.

To the support terminals, the interference measurement zero-power CSI-RSs are reported. The support terminals measure interference from the signals received in the resources of the interference measurement zero-power CSI-RSs reported. The interference measurement zero-power CSI-RSs have zero power, so that the signals received in the interference measurement zero-power CSI-RS resources are interference signals from the other transmission point TP #2, on an as-is basis. Channel states are measured using conventional CSI-RSs. To measure interference, in addition to interference measurements using signals that are received in the resources of the interference measurement zero-power CSI-RS, it is equally possible to measure interference using conventional CSI-RSs. In interference measurements using conventional CSI-RSs, interference is measured by separating the CSI-RSs transmitted from the connecting transmission point TP #1 and the CSI-RSs transmitted from other transmission points (transmission points other than TP #2 in FIG. 6).

To the conventional terminals (Rel. 10), the resources allocated to the interference measurement zero-power CSI-RSs are reported as zero-power CSI-RSs. The conventional terminals (Rel. 10) exclude the interference measurement zero-power CSI-RS resources and demodulate the signals.

Figure 7:
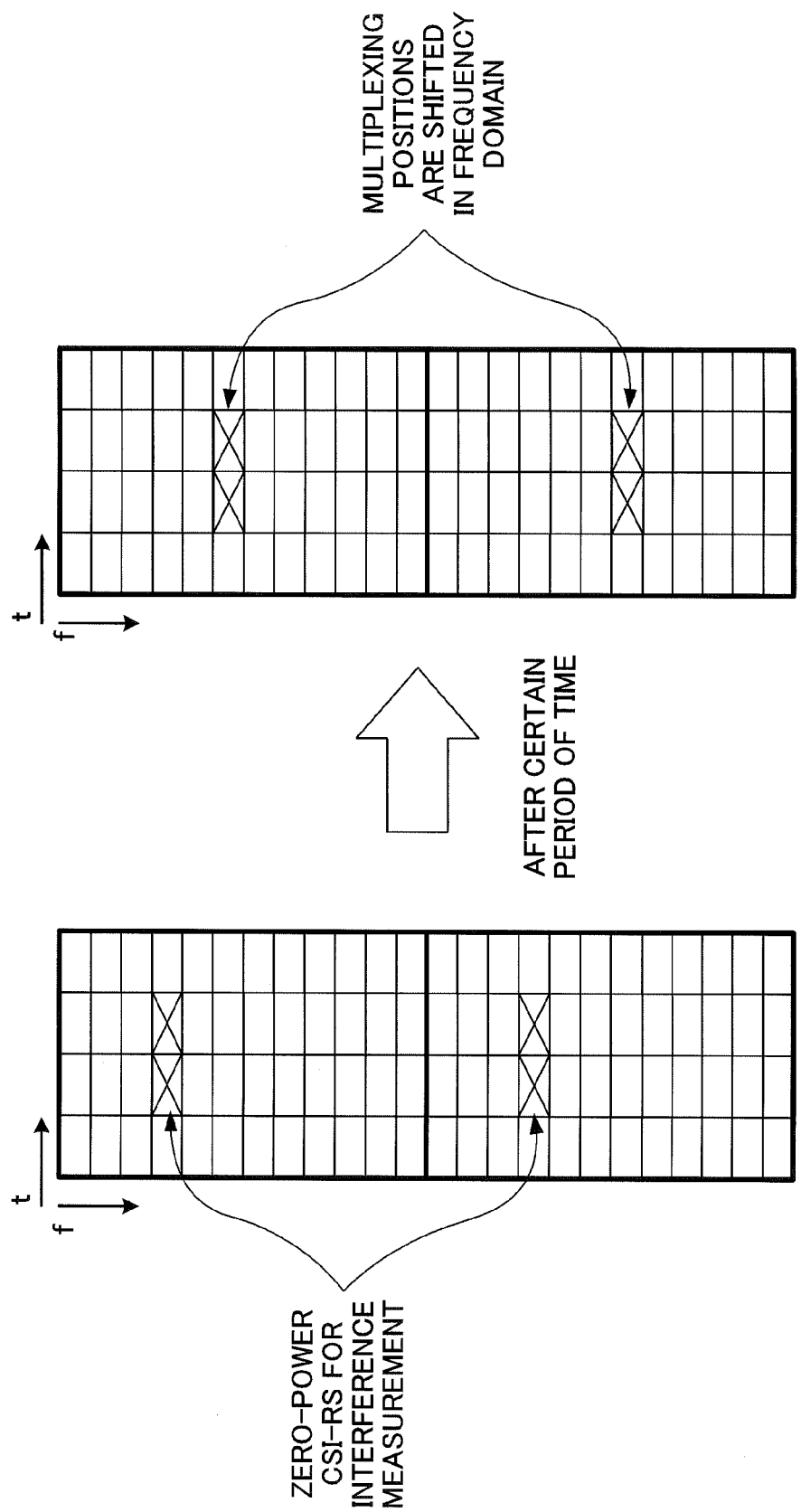
FIG. 7 is a diagram to show a case where the multiplexing positions of interference measurement zero-power CSI-RSs are changed.
Figure 8:
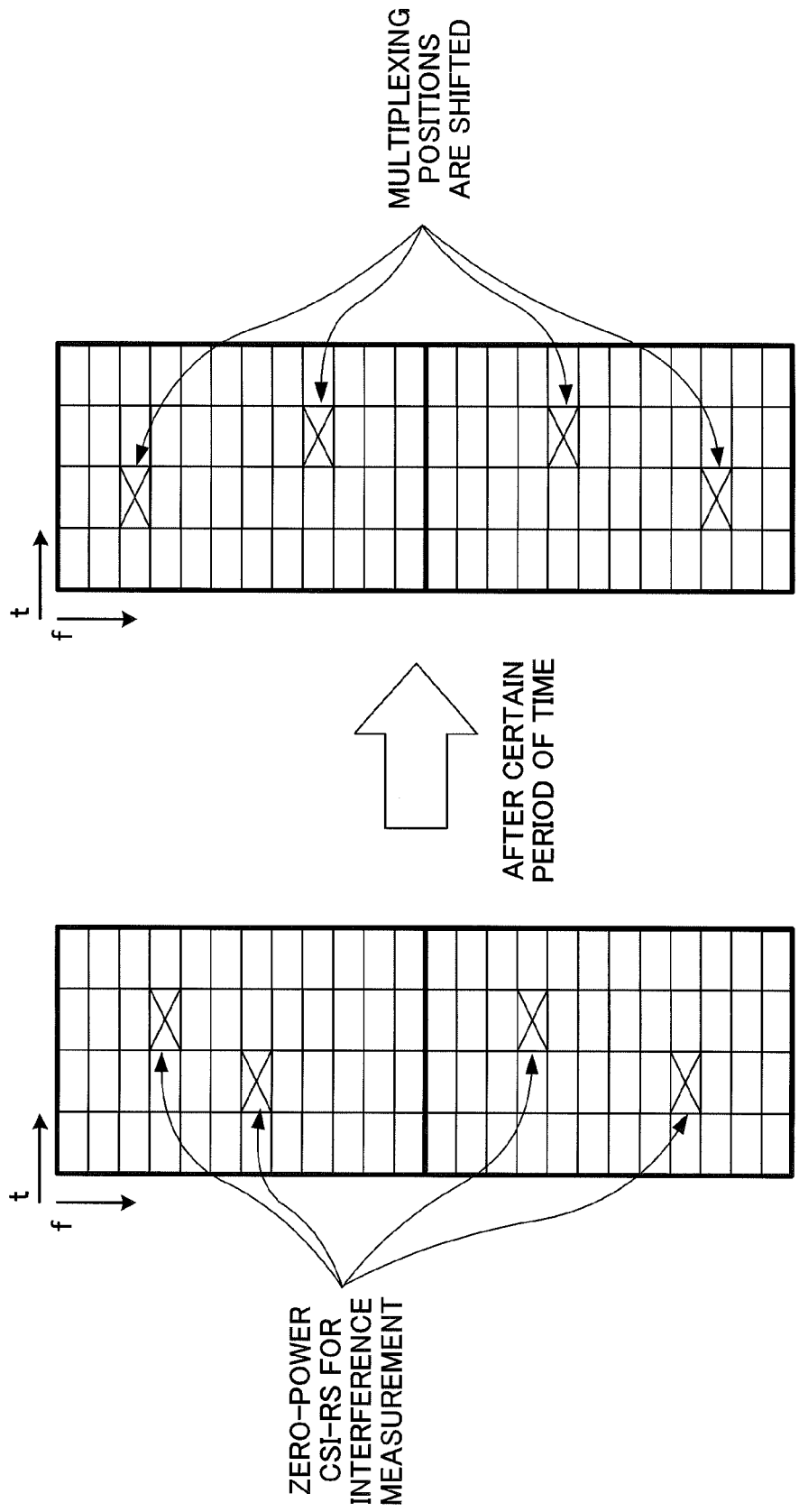
FIG. 8 is a diagram to show a case where the multiplexing positions of interference measurement zero-power CSI-RSs are changed.

According to a fourth aspect of the present invention, patterns in which zero-power CSI-RSs or CSI-RSs that are used in interference measurements alone (hereinafter referred to as "interference measurement zero-power CSI-RSs" and "interference measurement CSI-RSs," respectively) are added is applied, and, as shown in FIG. 7 and FIG. 8, the multiplexing positions of the interference measurement zero-power CSI-RSs or the interference measurement CSI-RSs are changed in at least one domain of the time domain and the frequency domain. FIG. 7 illustrates a case where the multiplexing positions of the interference measurement zero-power CSI-RSs are changed in the frequency domain, and FIG. 8 illustrates a case where the multiplexing positions of the interference measurement zero-power CSI-RSs are changed in the time domain and the frequency domain. By this means, it is possible to increase the possible total number of radio resources to use in interference measurements.

When the multiplexing positions of the interference measurement zero-power CSI-RSs or the interference measurement CSI-RSs are changed in at least one domain of the time domain and the frequency domain, it is possible to change the multiplexing positions based on predetermined patterns or change the multiplexing positions randomly. The regions in time or the regions in frequency where the multiplexing positions are changed may be within the regions where conventional CSI-RSs are multiplexed.

It is equally possible to implicitly report the patterns of changing the multiplexing positions of the interference measurement zero-power CSI-RSs or the interference measurement CSI-RSs to the support terminals.

According to a fifth aspect of the present invention, interference measurement zero-power CSI-RS or interference estimation CSI-RSs of resource element units, which are used in interference measurements alone, are placed randomly (hopping), and the hopping pattern is changed in at least one domain of the time domain and the frequency domain. By this means, it is possible to change the possible total number of radio resources to use in interference measurements.

When the hopping pattern of the interference measurement zero-power CSI-RSs or the interference measurement CSI-RSs is changed in at least one domain of the time domain and the frequency domain, it is possible to change the multiplexing position based on predetermined patterns or change the multiplexing positions randomly. The time domains or the frequency domains where the multiplexing positions are changed may be within the multiplexing regions of conventional CSI-RSs.

The pattern of changing the hopping pattern of the interference measurement zero-power CSI-RSs or the interference measurement CSI-RSs may be reported to the support terminals implicitly.

According to a sixth aspect of the present invention, patterns in which CSI-RSs that are used in interference measurements alone (hereinafter referred to as "interference measurement CSI-RSs") are added is applied, and the sequence of the interference measurement CSI-RSs is changed in at least one domain of the time domain and the frequency domain. By this means, it is possible to change the possible total number of radio resources to use in interference measurements.

When the sequence of the interference measurement CSI-RSs is changed in at least one domain of the time domain and the frequency domain, it is possible to change the sequence based on predetermined patterns or change the sequence randomly.

The pattern of changing the interference measurement CSI-RS sequence may be reported to the support terminals implicitly.

According to a seventh aspect of the present invention, interference estimation CSI-RS of resource element units, which are used in interference measurements alone, are placed randomly (hopping), and the sequence is changed in the at least one domain of the time domain and the frequency domain. By this means, it is possible to change the possible total number of radio resources to use in interference measurements.

In order to change the interference measurement CSI-RS sequence in at least one domain of the time domain and the frequency domain, it is possible to change the sequence based on predetermined patterns or change the sequence randomly.

It is equally possible to report the pattern of changing the interference measurement CSI-RS sequence to the support terminals implicitly.

According to an eighth aspect of the present invention, interference measurement zero-power CSI-RSs of resource element units (hereinafter referred to as "random holes") are placed randomly in CSI-RS transmission resources (hopping).

By this means, it is possible to increase the number of patterns of random holes (interference measurement zero-power CSI-RSs of resource element size). It is possible to measure interference using both conventional CSI-RSs (non-zero-power CSI-RSs) and random holes (interference measurement zero-power CSI-RSs), and, since the number of CSI-RSs that can be used in interference measurements increases, it is possible to improve the accuracy of interference measurements. Since the random holes have zero transmission power, it is possible to handle the signal components that are received in the interference measurement zero-power CSI-RS resources as interference components on an as-is basis, so that it is possible to reduce the processing load for interference measurements.

Figure 9:
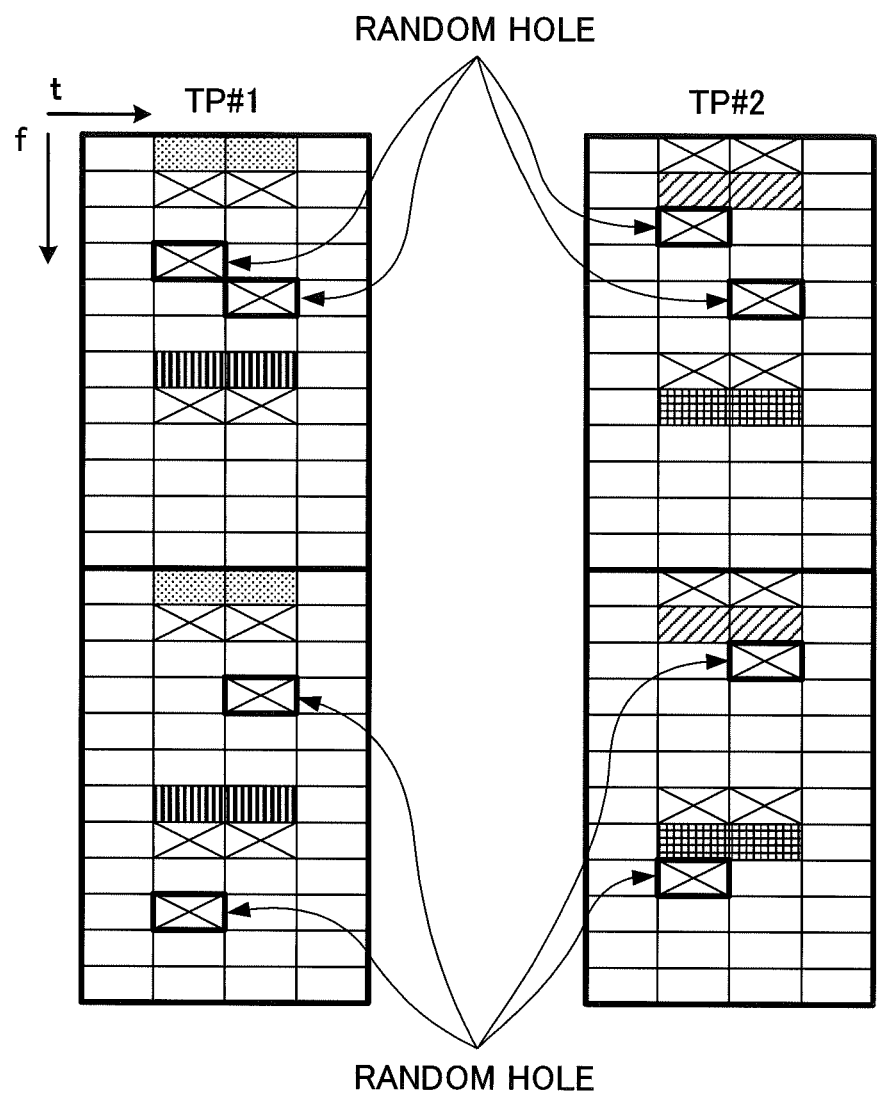
FIG. 9 is a diagram to show CSI-RS patterns including random holes.

Here, an interference measurement method based on random holes will be described. A system configuration in which two radio base stations serve as transmission points TP #1 and TP #2 will be described as an example. FIG. 9 shows an example of CSI-RS patterns in which random holes are added, where two resource blocks of the eighth, ninth, tenth and eleventh symbols shown in FIG. 1A are taken out.

In transmission point TP #1, random holes are each placed in resource elements (10) that are apart from the resource elements (7) in the upper resource block, and random holes are each placed in resource elements (19) that are apart from the resource elements (8) in the lower resource block. Among the CRSI-RS transmission resources (among resource elements 1 to 24, if limited to the regions shown in FIG. 9), random holes are randomly placed, in accordance with random pattern 1, in regions not including the resource elements (1, 2) and (13, 14) where conventional CSI-RSs are placed.

In transmission point TP #2, random holes are each placed in resource elements (10) that are apart from the resource elements (5) in the upper resource block, and random holes are each placed in resource elements (17) that are apart from the resource element (6) in the lower resource block. Among the CRSI-RS transmission resources, random holes are randomly placed, in accordance with random pattern 2, in regions not including the resource elements (3, 4) and (15, 16) where conventional CSI-RSs are placed.

The range of resources where random holes are randomized may be an arbitrary range. Random pattern 1 and random pattern 2 may not be adjusted such that random holes do not overlap between the two. It is equally possible to limit the range of resources to randomize, within the CSI-RS patterns or zero-power CSI-RS patterns. In one resource block shown in FIG. 9, there are twenty resource elements where random holes can be placed (including zero-power CSI-RSs). If randomization is carried out in one resource block, there are random patterns to equal the number of combinations of two resource elements that can be chosen out of twenty. If randomization is carried out in two resource blocks, there are random patterns to equal the number of combinations of four resource elements that can be chosen out of forty.

The radio base station (TP #1) to constitute transmission point #1 implicitly reports configuration information of the random holes shown in FIG. 9 to support terminals that support the random holes for interference measurements, among the user terminals connected to TP #1, and, to the conventional terminals (Rel. 10), implicitly reports configuration information of the conventional CSI-RSs shown in FIG. 4, and furthermore implicitly reports the random holes as zero-power CSI-RSs.

The support terminals measure interference using the reported random holes, and measure channel states using the conventional CSI-RSs. To measure interference, in addition to interference measurements using random holes, it is equally possible to measure interference using conventional CSI-RSs. The random holes have zero power, so that the signals received in the random holes for interference measurements are interference signals from the other transmission point TP #2, on an as-is basis. In interference measurements using conventional CSI-RSs, interference is measured by separating the CSI-RSs transmitted from the connecting transmission point TP #1 and the CSI-RSs transmitted from other transmission points (transmission points other than TP #2 in FIG. 9).

To the conventional terminals (Rel. 10), the resources allocated to the random holes are reported as zero-power CSI-RSs. The conventional terminals (Rel. 10) carry out data demodulation by excluding the random holes.

According to a ninth aspect of the present invention, in regions where CSI-RSs can be placed, interference measurement CSI-RSs of resource element units (hereinafter referred to as "random CSI-RSs") are placed randomly (hopping). It is equally possible to replace the random holes according to the above fourth aspect with non-zero-power CSI-RSs.

Figure 10:
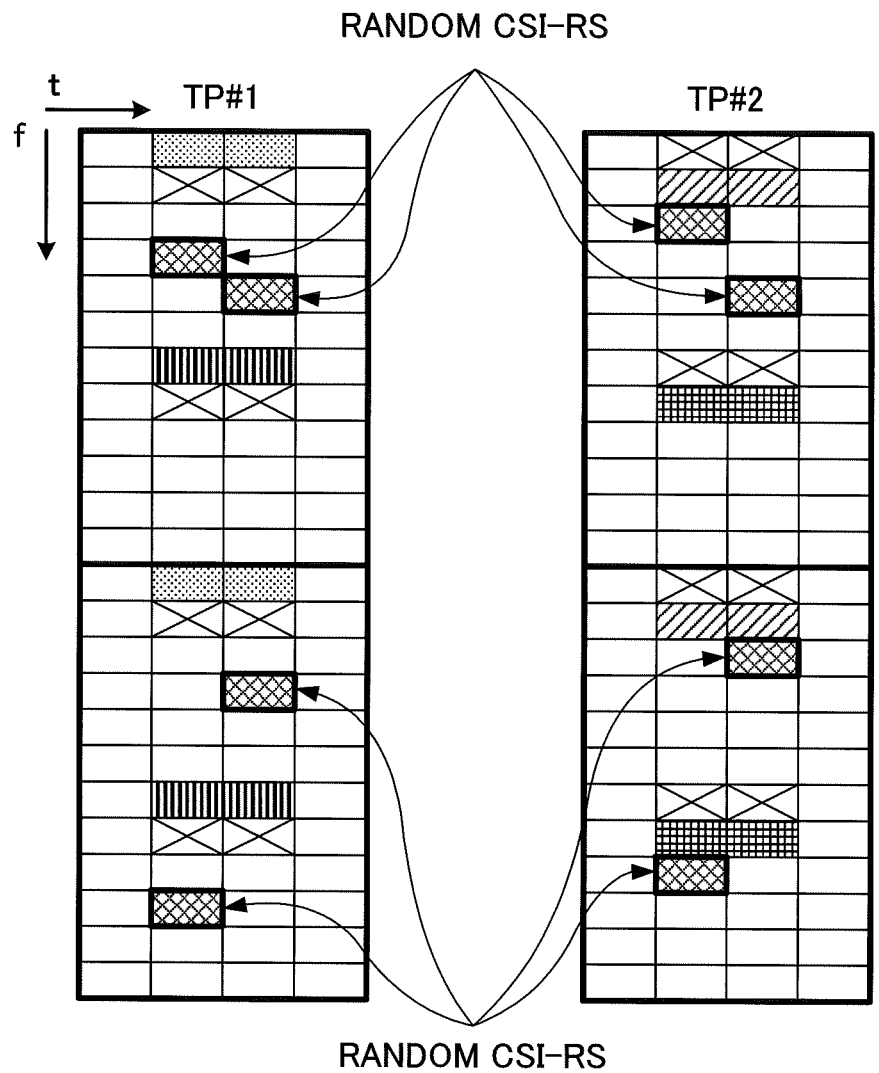
FIG. 10 is a diagram to show CSI-RS patterns including random CSI-RSs.

FIG. 10 shows an example of CSI-RS patterns in which random CSI-RSs are placed, where two resource blocks of the eighth, ninth, tenth and eleventh symbols shown in FIG. 1A are taken out. As for the random patterns, the same pattern as the CSI-RS patterns shown in FIG. 9 are used.

In this way, even when an interference measurement method based on random CSI-RSs is employed, it is possible to increase the number of patterns that can be used in interference measurements, and, since the random CSI-RSs are non-zero-power CSI-RSs, it is possible to increase the number of interference measurement reference signals, and increase the number of channel state measurement reference signals for CSI.

According to a tenth aspect of the present invention, the same interference measurement zero-power CSI-RS patterns are used between transmission points or between two or more interference measurement resources. Although interference measurement zero-power CSI-RSs are allocated to two resource elements formed with two consecutive symbols having the same frequency, one random hole is allocated to one resource element between the two resource elements for one transmission point, and one random hole is allocated to the other resource element between the two resource elements for the other transmission point. To the conventional terminals (Rel. 10), sets SET 1 and SET 2 of resource elements (two resource elements) where interference measurement zero-power CSI-RSs are allocated are reported as zero-power CSI-RSs.

By this means, it is possible to report the random holes (and resource elements that neighbor the random holes) to the conventional terminals (Rel. 10) by using conventional patterns, and prevent the accuracy of data demodulation from deteriorating.

Figure 11:
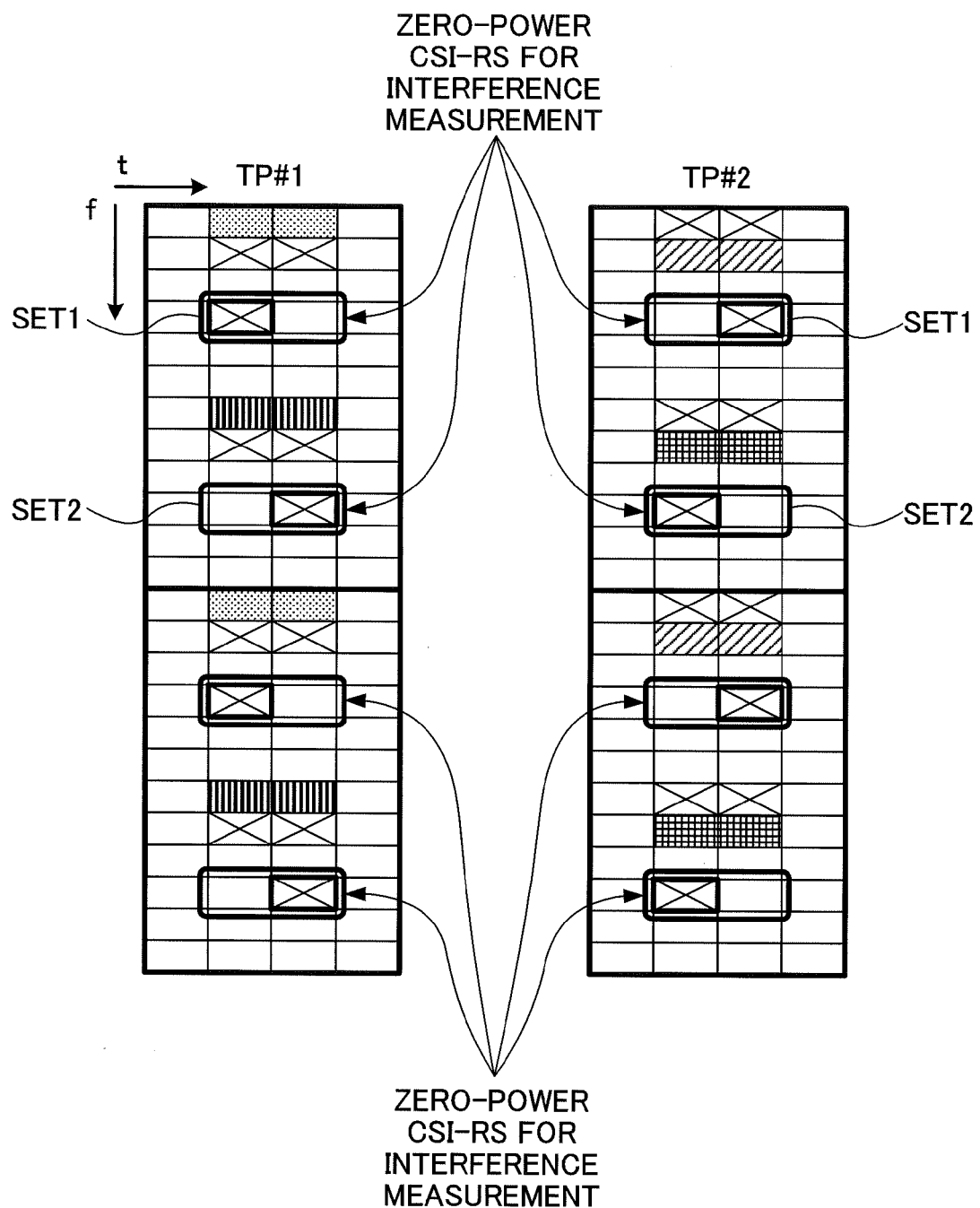
FIG. 11 is a diagram to show CSI-RS patterns including the same random holes between transmission points.

Here, an interference measurement method based on the same interference measurement zero-power CSI-RS patterns will be described. FIG. 11 shows an example of the same interference measurement zero-power CSI-RS patterns, where two resource blocks of the eighth, ninth, tenth and eleventh symbols shown in FIG. 1A are taken out.

In transmission point TP #1, in one resource block, interference measurement zero-power CSI-RSs are placed in resource element sets SET 1 (7, 8) and SET 2 (19, 20), where the left element in resource element set SET 1 (7, 8) is designated a random hole, and the right element in resource element set SET 2 (19, 20) is designated a random hole.

In transmission point TP #2, interference measurement zero-power CSI-RSs are placed in the same patterns as in transmission point TP #1. However, the positions of the random holes are made orthogonal between the transmission points (that is, the left and the right are placed opposite). That is, in one resource block, interference measurement zero-power CSI-RSs are placed in resource element sets SET 1 (7, 8) and SET 2 (19, 20), where the right element (8) in resource element set SET 1 (7, 8) is designated a random hole, and the left element (19) in resource element set SET 2 (19, 20) is designated a random hole.

The radio base station to constitute transmission point TP #1 implicitly reports the interference measurement zero-power CSI-RS patterns shown in FIG. 11 to the support terminals connected with that radio base station. The radio base station may furthermore implicitly report the positions of the random holes (the left/right positions in the resource element sets SET), or may implicitly report only the positions of the random holes (the left/right positions in the resource element sets SET). With this example, interference measurement zero-power CSI-RS pattern information and random hole position information are implicitly reported. Otherwise, it is also possible to define new patterns which can specify not only the interference measurement zero-power CSI-RS placement patterns, but which can also specify the positions of random holes as well. To the conventional terminals (Rel. 10), the radio base station implicitly reports configuration information of the conventional CSI-RSs shown in FIG. 4, and furthermore implicitly reports the interference measurement zero-power CSI-RSs as zero-power CSI-RSs. The interference measurement zero-power CSI-RS are based on the CSI-RS patterns (four ports) defined in LTE-A (Rel. 10), which are also used to report zero-power CSI-RSs.

By this means, even when random holes of resource element units are configured, unsafe resources that may not be demodulated correctly are reported to the conventional terminals (Rel. 10) by a signaling method that is supported, so that it is possible to prevent the accuracy of data demodulation from deteriorating.

According to an eleventh aspect of the present invention, the same interference measurement CSI-RS patterns are used between transmission points or between two or more interference measurement resources. That is, the random holes that are each allocated to one resource element of interference measurement zero-power CSI-RSs in the above tenth aspect are replaced with interference measurement-only non-zero-power CSI-RSs. Although the interference measurement-only CSI-RSs are allocated to two resource elements formed with two consecutive symbols that have the same frequency, in one transmission point, one interference measurement-only CSI-RS is allocated to one resource element between the two resource elements, and no reference signal is allocated to the other resource element. Where two resource elements are allocated to an interference measurement-only CSI-RS, in the other transmission point, one interference measurement-only CSI-RSs is allocated to the other resource element between the two resource elements. To the conventional terminals (Rel. 10), sets SET 1 and SET 2 of resource elements (two resource elements) where interference measurement zero-power CSI-RSs are allocated are reported as zero-power CSI-RSs.

By this means, it is possible to report the interference measurement-only CSI-RSs (and resource elements that neighbor the interference measurement-only CSI-RSs) to the conventional terminals (Rel. 10) by using conventional patterns, and prevent the accuracy of data demodulation from deteriorating.

Although conventional CSI-RS for interference measurements (FIG. 3), interference measurement-only CSI-RSs (FIG. 5) and interference measurement zero-power CSI-RSs (FIG. 6) are added in the CSI-RS patterns shown in FIGS. 3, 5 and 6, these added CSI-RSs follow (or "re-use") the conventional CSI-RS patterns defined LTE-A (Rel. 10) on an as-is basis. Consequently, it is possible to signal the resources to be muted, to the conventional terminals (Rel. 10), within the range of the capacities of the terminals (the functions which the terminals support).

Figure 13A:
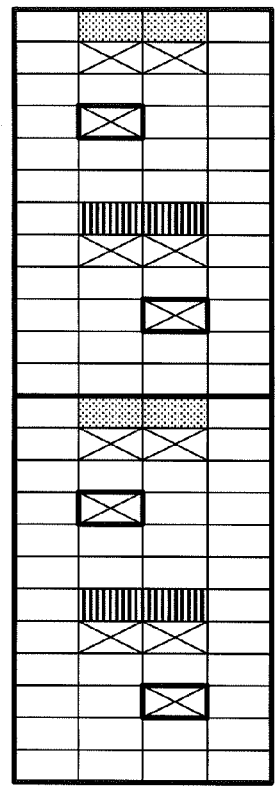
FIG. 13 provides diagrams to show CSI-RS patterns for explaining a signaling method using 16-bit bitmap.

The CSI-RS patterns shown in FIGS. 9 and 10 are different from the conventional CSI-RS patterns. A measure that is taken when different CSI-RS patterns from the conventional CSI-RS patterns (Rel. 10) are employed so as to alleviate the impact on conventional terminals (Rel. 10) will be described with reference to FIGS. 13A and 13B. As shown in FIG. 13A, when CSI-RS patterns in which random holes are added are employed, conventional terminals (Rel. 10) cannot recognize the random holes from the conventional CSI-RS patterns, and an attempt to demodulate data without excluding the random holes results in deterioration of the accuracy of data demodulation.

In LTE-A (Rel. 10), a zero-power CSI-RS signaling method is defined. The above signaling method can be used to report random holes (or random CSI-RSs) which the conventional terminals (Rel. 10) cannot support, and to report neighboring resource elements, which are neighboring symbols of the random holes (or random CSI-RS) and which have the same frequency, to the conventional terminals (Rel. 10). By this means, it is possible to report resource elements that may not be demodulated accurately, to the conventional terminals (Rel. 10).

Figure 12:
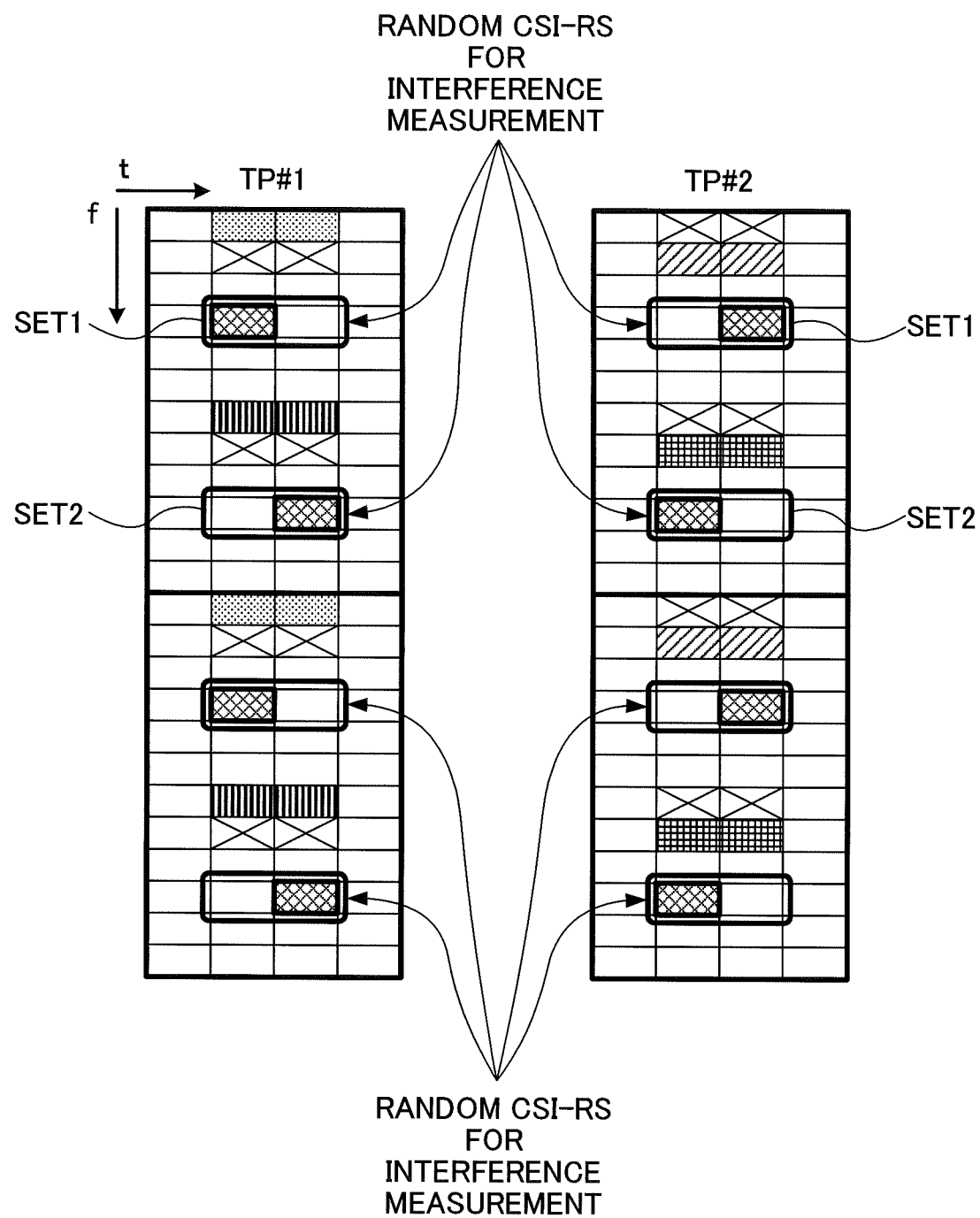
FIG. 12 is a diagram to show CSI-RS patterns including the same CSI-RSs between transmission points.

16-bit bitmap information is reported, in association with indices [#0-#9 and #20-#25] (CSI configurations=0-9 and 20-25), in which TDD additional patterns are added to FDD normal patterns, as shown in FIG. 1C, from the radio base station to user terminals. For example, as a fundamental pattern, when a zero-power CSI-RS is allocated to the CSI-RS resource indicated by index #6, the bitmap information [0000001000000000] is reported. In the bitmap information, "1" is set in the resource where the zero-power CSI-RS is allocated, and "0" is set in resources that are not muted. One bit on the 16-bit bitmap can command on and off of muting with respect to four resource elements at the same time. In the example shown in FIG. 11B, SET 1 and SET 2 can be made "off" (that is, muted) at the same time, by means of the bitmap information [0001000000000000], in which "1" is set in index #7. This is effective when, as shown in FIGS. 11 and 12, the same interference measurement zero-power CSI-RS patterns (FIG. 11) or interference measurement random CSI-RS patterns (FIG. 12) are employed between a plurality of transmission points TP #1 and TP #2. Looking at the interference measurement zero-power CSI-RS patterns shown in FIG. 9, in the interference measurement zero-power CSI-RS patterns applied to TP #1, an interference measurement zero-power CSI-RS is allocated to the left resource element in SET #1, and, in the interference measurement zero-power CSI-RS pattern applied to TP #2, an interference measurement zero-power CSI-RS is allocated to the right resource element in SET #1. Similarly, in SET #2 between TP #1 and TP #2, the same orthogonal relationship is kept. With 16-bit bitmap information, four resource elements can be designated with one bit, so that it is possible to cover both transmission points TP #1 and TP #2 with the same interference measurement zero-power CSI-RS patterns. By employing this conventional signaling method, it is possible to report four resource elements or eight resource elements (or a number of resource elements to equal multiples of four) as zero-power CSI-RSs.

Figure 13B:
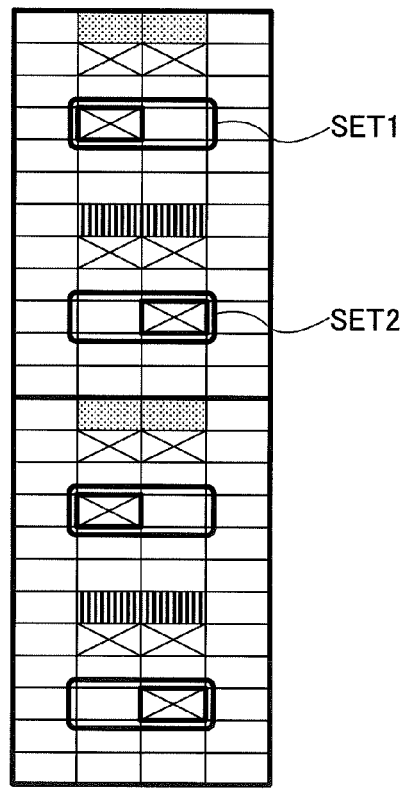

As shown in FIG. 13B, interference measurement zero-power CSI-RSs (resource element sets SET 1 and SET 2 including random holes) are defined based on CSI-RS patterns used in 16-bit bitmap information. By this means, the resource element sets SET 1 and SET 2 including random holes become one pattern that is included in the conventional CSI-RS patterns. Consequently, if the resource element sets SET 1 and SET 2 including random holes are signaled to the conventional terminals (Rel. 10) as zero-power CSI-RSs, the conventional terminals (Rel. 10) can recognize the resource element sets SET 1 and SET 2 including random holes, and demodulate data avoiding these resources.

A twelfth aspect of the present invention provides an interference measurement method that combines an interference measurement method according to one of the first aspect to the eleventh aspect described above, with conventional (Rel. 10) CRSs, CSI-RSs, zero-power CSI-RSs and data channels.

For example, when support terminals measure interference, interference may be estimated using high-density CSI-RSs alone, or interference may be estimated by combining high-density CSI-RSs additionally with one of conventional CSI-RSs, conventional zero-power CSI-RSs, conventional CRSs and data channels.

When support terminals measure interference, interference may be estimated using interference measurement-only CSI-RSs alone, or interference may be estimated by combining interference measurement-only CSI-RSs additionally with one of conventional CSI-RSs, conventional zero-power CSI-RSs, conventional CRSs and data channels.

When support terminals measure interference, interference may be estimated using interference measurement zero-power CSI-RSs alone, or interference may be estimated by combining interference measurement zero-power CSI-RSs additionally with one of conventional CSI-RSs, conventional zero-power CSI-RS, conventional CRSs and data channels.

When support terminals measure interference, interference may be estimated using random holes alone, or interference may be estimated by combining random holes additionally with one of conventional CSI-RSs, conventional zero-power CSI-RSs, conventional CRSs and data channels.

When support terminals measure interference, interference may be estimated using random CSI-RSs alone, or interference may be estimated by combining random CSI-RSs additionally with one of conventional CSI-RSs, conventional zero-power CSI-RSs, conventional CRSs and data channels.

When support terminals measure interference, interference may be estimated using interference measurement zero-power CSI-RS patterns alone, or interference may be estimated by combining interference measurement zero-power CSI-RS patterns additionally with one of conventional CSI-RSs, conventional zero-power CSI-RS, conventional CRSs and data channels.

When support terminals measure interference, interference may be estimated using the same interference measurement zero-power CSI-RSs alone between multiple transmission points, or interference may be estimated by combining interference measurement zero-power CSI-RS patterns additionally with one of conventional CSI-RSs, conventional zero-power CSI-RSs, conventional CRSs and data channels.

When support terminals measure interference, interference may be estimated using the same interference measurement random CSI-RSs alone between multiple transmission points, or interference may be estimated by combining interference measurement random CSI-RS patterns additionally with one of conventional CSI-RSs, conventional zero-power CSI-RSs, conventional CRSs and data channels.

Now, an example of measuring interference using the interference measurement method of one of the first aspect to the eleventh aspect described earlier herein and conventional CRSs will be described below.

For example, a system configuration will be considered here in which two pico cells (transmission points TP #2 and #3) are placed in a macro cell (transmission point TP #1). Assume that the same cell ID is assigned to the macro cell and the two pico cells. In this system configuration, CRSs of the same cell ID are placed in the same resources among the three cells, so that a user terminal has to measure interference based on CRSs received from cells other than one virtual cell where the three cells are combined. That is, by measuring interference using CRSs, it is possible to measure interference from cells apart from the virtual cell.

Interference from the macro cell and the two pico cells is measured by employing the interference measurement method of one of the first aspect to the eleventh aspect that uses CSI-RSs. CSI-RSs do not rely on cell IDs and therefore can be separated in cell units. If CSI-RS signal sequences are generated based on signal sequences incorporating user-specific identification information, the CSI-RSs can be separated by code-division and taken out, even when multiplexed over the same time/frequency resources.

Figure 14:
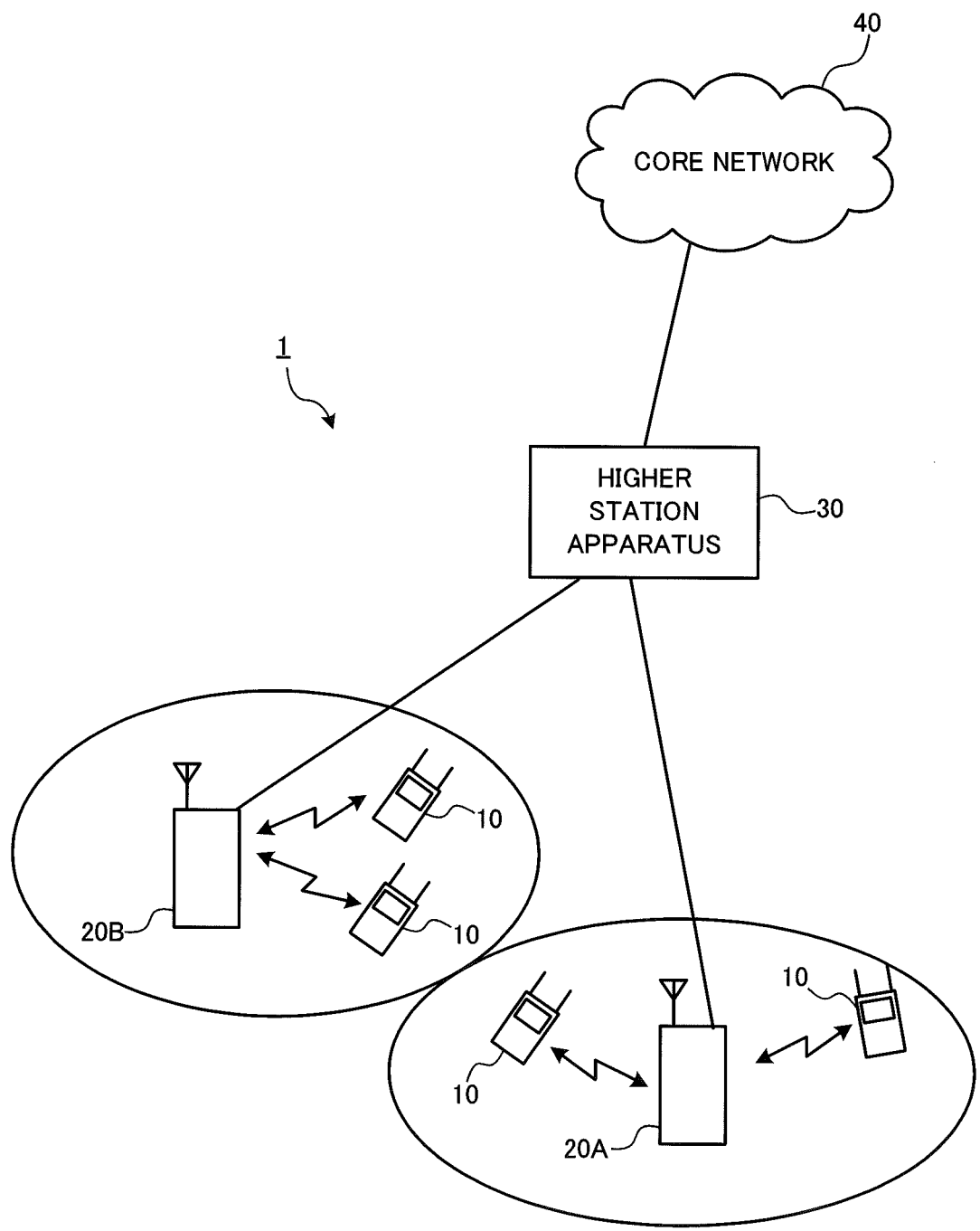
FIG. 14 is a diagram to explain a system configuration of a radio communication system.

Now, a radio communication system according to the present embodiment will be described in detail. FIG. 14 is a diagram to explain a system configuration of the radio communication system according to the present embodiment. Note that the radio communication system shown in FIG. 14 is a system to accommodate, for example, the LTE system or SUPER 3G. In this radio communication system, carrier aggregation to group a plurality of fundamental frequency blocks into one, where the system band of the LTE system is one unit, is used. This radio communication system may be referred to as "IMT-Advanced" or may be referred to as "4G."

As shown in FIG. 14, the radio communication system 1 is configured to include base station apparatuses 20A and 20B, which each serve as a transmission point, and mobile terminal apparatuses 10 that communicate with these base station apparatuses 20A and 20B. The base station apparatuses 20A and 20B are connected with a higher station apparatus 30, and this higher station apparatus 30 is connected with a core network 40. The base station apparatuses 20A and 20B are connected with each other by wire connection or by wireless connection. The mobile terminal apparatuses 10 can communicate with the base station apparatuses 20A and 20B in transmission points #1 and #2. Note that the higher station apparatus 30 may be, for example, an access gateway apparatus, a radio network controller (RNC), a mobility management entity (MME) and so on, but is by no means limited to these.

Although the mobile terminal apparatuses 10 include both conventional terminals (Rel. 10) and support terminals (for example, Rel. 11), the following description will be given simply with respect to a mobile terminal apparatus, unless specified otherwise. Although a mobile terminal apparatus 10 will be described to perform radio communication with the base station apparatuses 20A and 20B for ease of explanation, more generally, user equipment (UE) to include both mobile terminal apparatuses and fixed terminal apparatuses may be used as well.

Figure 16:
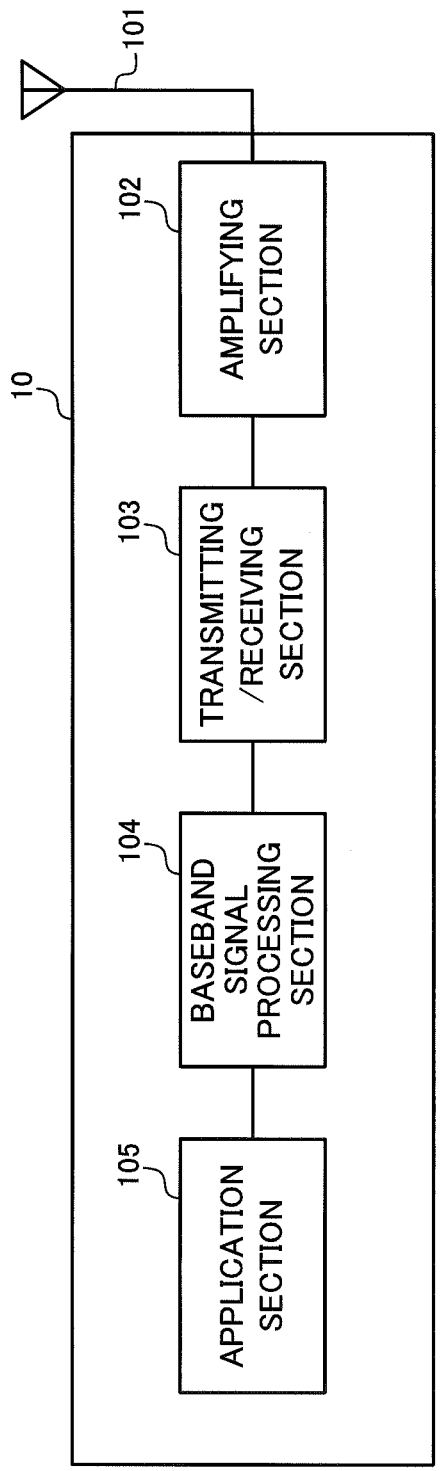
FIG. 16 is a diagram to explain an overall configuration of a mobile terminal apparatus.

Note that, for radio access schemes in the radio communication system 1 shown in FIG. 16, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels will be described. Downlink communication channels include a PDSCH (Physical Downlink Shared Channel), which is used by each mobile terminal apparatus 10 on a shared basis as a downlink data channel, and downlink L1/L2 control channels (PDCCH, PCFICH, PHICH). Transmission data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel).

Uplink communication channels include a PUSCH (Physical Uplink Shared Channel), which is used by each mobile terminal apparatus on a shared basis as an uplink data channel, and a PUCCH (Physical Uplink Control Channel), which is an uplink control channel. By means of this PUSCH, transmission data and higher control information are transmitted. Downlink radio quality information (CQI: Channel Quality Indicator), ACK/NACK and so on are transmitted by the PUCCH.

Figure 15:
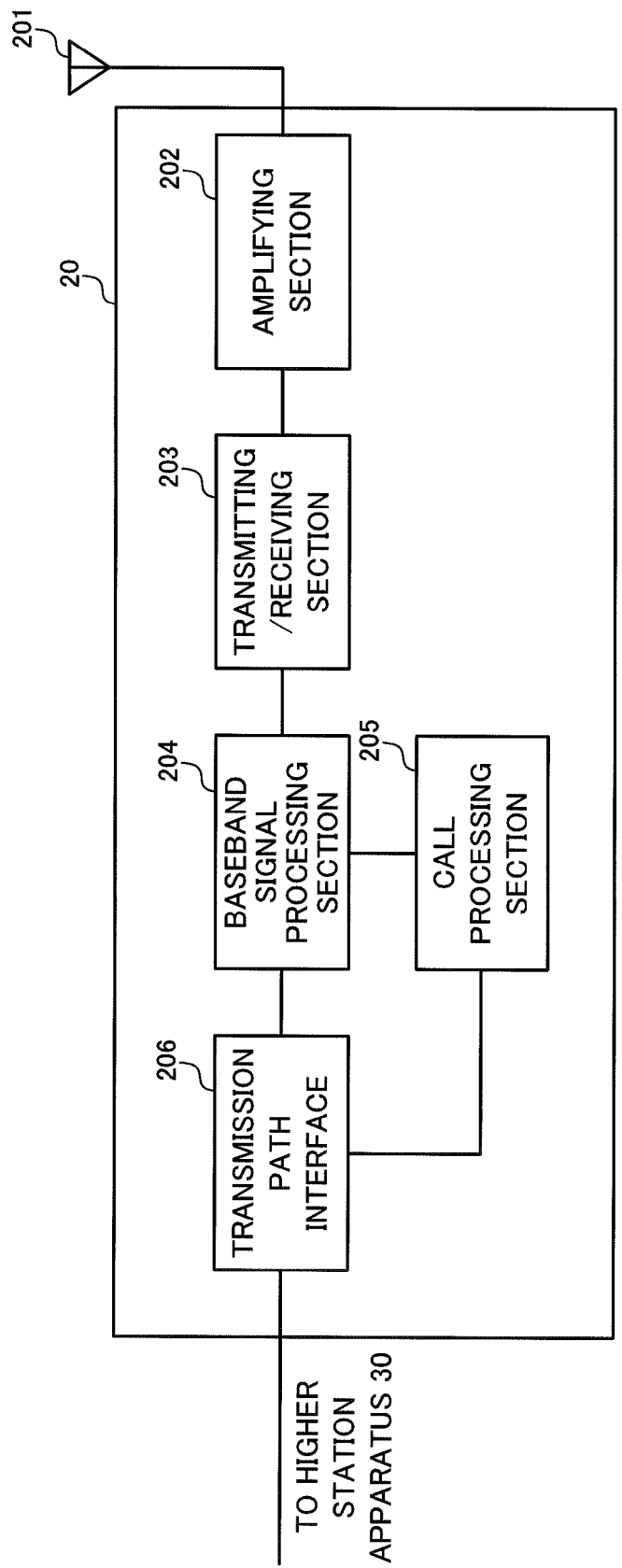
FIG. 15 is a diagram to explain an overall configuration of a base station apparatus.

An overall configuration of a base station apparatus according to the present embodiment will be described with reference to FIG. 15. Note that the base station apparatuses 20A and 20B have the same configuration and therefore will be described as "base station apparatus 20." The base station apparatus 20 includes a transmitting/receiving antenna 201, an amplifying section 202, a transmitting/receiving section (reporting section) 203, a baseband signal processing section 204, a call processing section 205, and a transmission path interface 206. Transmission data to be transmitted from the base station apparatus 20 to the mobile terminal apparatus on the downlink is input from the higher station apparatus 30 into the baseband signal processing section 204 via the transmission path interface 206.

In the baseband signal processing 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. A signal of a physical downlink control channel, which is a downlink control channel, is also subjected to transmission processes such as channel coding and an inverse fast Fourier transform.

The baseband signal processing section 204 reports control information for allowing each mobile terminal apparatus 10 to carry out radio communication with the base station apparatus 20, to the mobile terminal apparatuses 10 that are connected to the same transmission point, by a broadcast channel. The information for allowing communication in the transmission point includes, for example, the uplink or downlink system bandwidth, root sequence identification information (root sequence indices) for generating random access preamble signals in the PRACH (Physical Random Access Channel), and so on.

The baseband signals that are output from the baseband signal processing section 204 are converted into a radio frequency band in the transmitting/receiving sections 203. The amplifying sections 202 amplify the radio frequency signals having been subjected to frequency conversion, and output the results to the transmitting/receiving antenna 201.

As for signals to be transmitted from the mobile terminal apparatus 10 to the base station apparatus 20 on the uplink, a radio frequency signal that is received in the transmitting/receiving antenna 201 is amplified in the amplifying section 202, converted into a baseband signal through frequency conversion in the transmitting/receiving section 203, and input in the baseband signal processing section 204.

The baseband signal processing section 204 performs an FFT process, an IDFT process, error correction decoding, a MAC retransmission control receiving process, and RLC layer and PDCP layer receiving processes of the transmission data that is included in the baseband signal received on the uplink. The decoded signal is transferred to the higher station apparatus 30 through the transmission path interface 206.

The call processing section 205 performs call processing such as setting up and releasing communication channels, manages the state of the base station apparatus 20, and manages the radio resources.

Next, an overall configuration of the mobile terminal apparatus according to the present embodiment will be described with reference to FIG. 16. A mobile terminal apparatus 10 has a transmitting/receiving antenna 101, an amplifying section 102, a transmitting/receiving section (receiving section) 103, a baseband signal processing section 104, and an application section 105.

As for downlink data, a radio frequency signal that is received in the transmitting/receiving antennas 101 is amplified in the amplifying sections 102, and converted into a baseband signal through frequency conversion in the transmitting/receiving sections 103. This baseband signal is subjected to an FFT process, error correction decoding, a retransmission control receiving process and so on, in the baseband signal processing section 104. In this downlink data, downlink transmission data is transferred to the application section 105. The application section 105 performs processes related to higher layers above the physical layer and the MAC layer, and so on. In the downlink data, broadcast information is also transferred to the application section 105.

Uplink transmission data is input from the application section 105 into the baseband signal processing section 104. The baseband signal processing section 104 performs a mapping process, a retransmission control (HARQ) transmission process, channel coding, a DFT process, and an IFFT process. The baseband signal that is output from the baseband signal processing section 104 is converted into a radio frequency band in the transmitting/receiving sections 103. After that, the amplifying section 102 amplifies the radio frequency signal having been subjected to frequency conversion, and transmits the result from the transmitting/receiving antenna 101.

Figure 17:
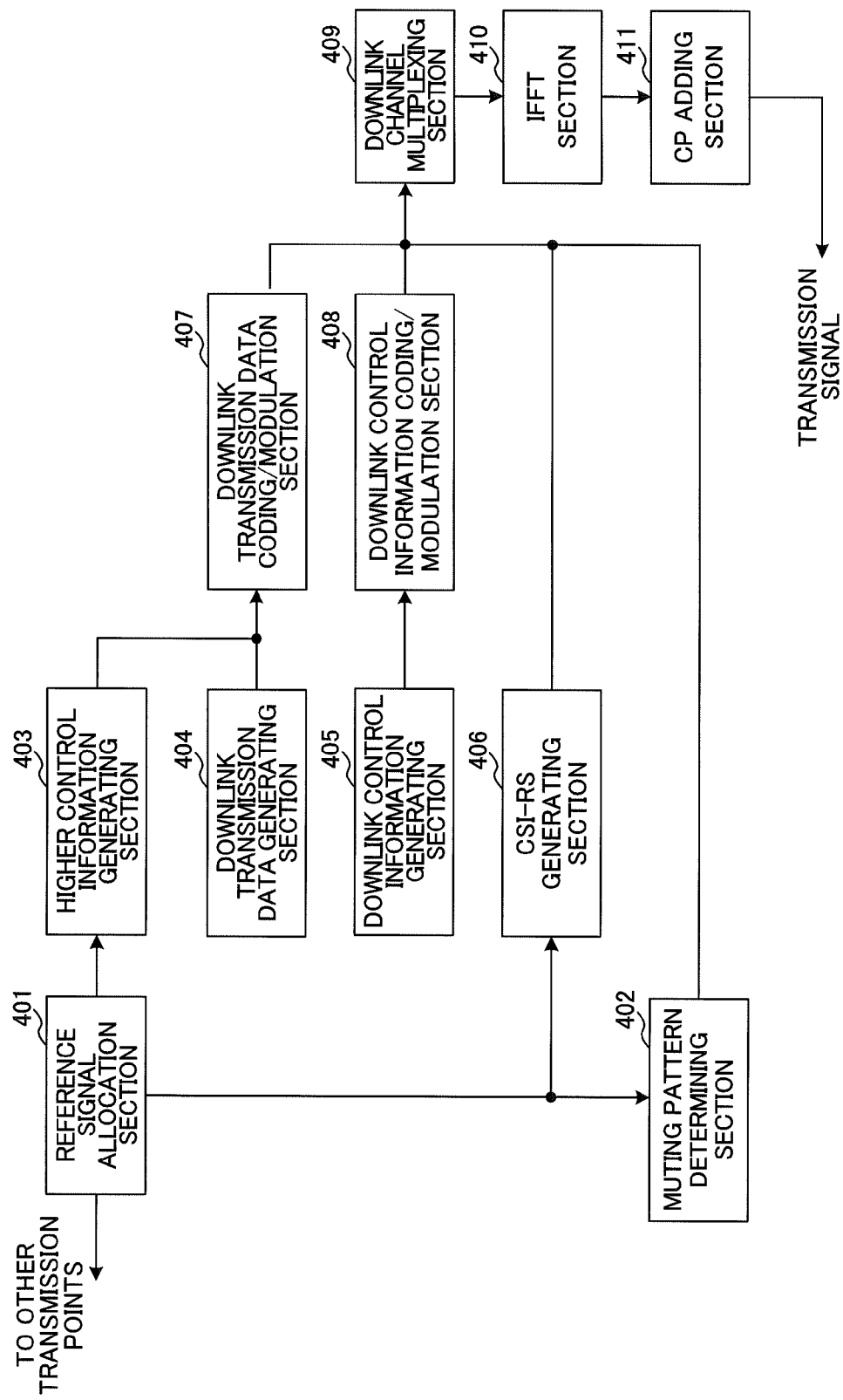
FIG. 17 is a functional block diagram of a base station apparatus.

The function blocks of the base station apparatus pertaining to the process of determining CSI-RS patterns will be described with reference to FIG. 17. Note that the function blocks of FIG. 17 primarily relate to the baseband signal processing section shown in FIG. 15. The functional block diagram of FIG. 17 is simplified to explain the present invention, but is assumed to have configurations which a baseband signal processing section should normally have.

The base station apparatus 20 has, on the transmitting side, a reference signal allocation section 401, a muting pattern determining section 402, a higher control information generating section 403, a downlink transmission data generating section 404, a downlink control information generating section 405, a CSI-RS generating section 406, a downlink transmission data coding/modulation section 407, and a downlink control information coding/modulation section 408. The base station apparatus 20 has a downlink channel multiplexing section 409, an IFFT section 410, and a CP adding section 411.

Based on the CSI-RS patterns shown in one of FIGS. 3, 5, 6, 9 and 10, the reference signal allocation section 401 allocates additional CSI-RSs (one of interference measurement-only CSI-RSs, interference measurement zero-power CSI-RSs, random holes and random CSI-RSs) to CSI-RS resources. Allocation information of the CSI-RS patterns including the additional CSI-RSs is sent to the higher control information generating section 403 so as to be implicitly reported to the mobile terminal apparatuses that serves as support terminals, and also sent to the CSI-RS generating section 406 in order to generate CSI-RSs. Zero-power CSI-RS allocation information (which may be in bitmap format) to be implicitly reported to the mobile terminal apparatuses is reported to the muting pattern determining section 402. The reference signal allocation section 401 allocates zero-power CSI-RSs that mask the additional CSI-RSs, to conventional terminals (Rel. 10). To the support terminals, zero-power CSI-RSs that are defined for channel state measurements are allocated. The allocated zero-power CSI-RS patterns may be referred to as "muting information."

The muting pattern determining section 402 determines the muting patterns based on zero-power CSI-RS allocation information. The muting pattern determining section 402 uses muting patterns that are based on CSI-RS patterns supported by the conventional terminals (Rel. 10). The additional CSI-RSs (CSI-RSs for both channel state measurements and interference measurements, interference measurement-only CSI-RSs, and interference measurement zero-power CSI-RSs) illustrated in FIGS. 3, 5 and 6 are based on muting patterns that are then based on CSI-RS patterns supported by the conventional terminals (Rel. 10). However, the additional CSI-RSs (random holes and random CSI-RSs) shown in FIG. 9 and FIG. 10 are not based on CSI-RS patterns which the conventional terminals (Rel. 10) support. So, as shown in FIG. 11 and FIG. 13B, random holes or random CSI-RS are packaged like resource element sets SET 1 and SET 2 that are formed with two resource elements. By this means, it is possible to signal additional CSI-RS resources as zero-power CSI-RSs based on CSI-RS patterns supported by the conventional terminals (Rel. 10).

The higher control information generating section 402 generates higher control information to be transmitted and received by way of higher layer signaling (for example, RRC signaling), and outputs the generated higher control information to the downlink transmission data coding/modulation section 406. The higher control information generating section 403 generates higher control information that includes the CSI-RS allocation pattern information output from the reference signal allocation section 401.

The downlink transmission data generating section 403 generates downlink transmission data, and outputs this downlink transmission data to the downlink transmission data coding/modulation section 407.

The downlink control information generating section 405 generates downlink control information, and outputs this downlink control information to the downlink control information coding/modulation section 408. The downlink transmission data coding/modulation section 407 performs channel coding and data modulation of the downlink transmission data and the higher control information, and outputs the results to the downlink channel multiplexing section 409. The downlink control information coding/modulation section 408 performs channel coding and data modulation of the downlink control information, and outputs the result to the downlink channel multiplexing section 409.

The CSI-RS generating section 406 generates CSI-RSs and outputs these CSI-RSs to the downlink channel multiplexing section 409. When, as shown in FIGS. 3, 5 and 10, additional CSI-RSs are non-zero-power CSI-RSs, the CSI-RS generating section 406 places these additional CSI-RSs, with conventional CSI-RSs, in accordance with CSI-RS allocation pattern information. When, as shown in FIGS. 6, 9 and 11, additional CSI-RSs are zero-power CSI-RSs, the CSI-RS generating section 406 does not distribute transmission power to the resources of the additional CSI-RSs.

The downlink channel multiplexing section 409 generates a transmission signal by combining the downlink control information, the CSI-RSs (including the additional CSI-RSs), the higher control information and the downlink transmission data. In this case, the downlink channel multiplexing section 409 multiplexes the downlink transmission data such that the positions to set muting, determined in the muting pattern determining section 402, are avoided. The downlink channel multiplexing section 409 outputs the generated transmission signal to the IFFT section 410. The IFFT section 410 applies an inverse fast Fourier transform to the transmission signal, and converts the transmission signal from a frequency domain signal to a time domain signal. The transmission signal after the IFFT is output to the CP adding section 411. The CP adding section 411 attaches CPs (cyclic prefixes) to the transmission signal after the IFFT, and outputs the transmission signal, to which CPs have been added, to the amplifying section 202 shown in FIG. 15.

Figure 18:
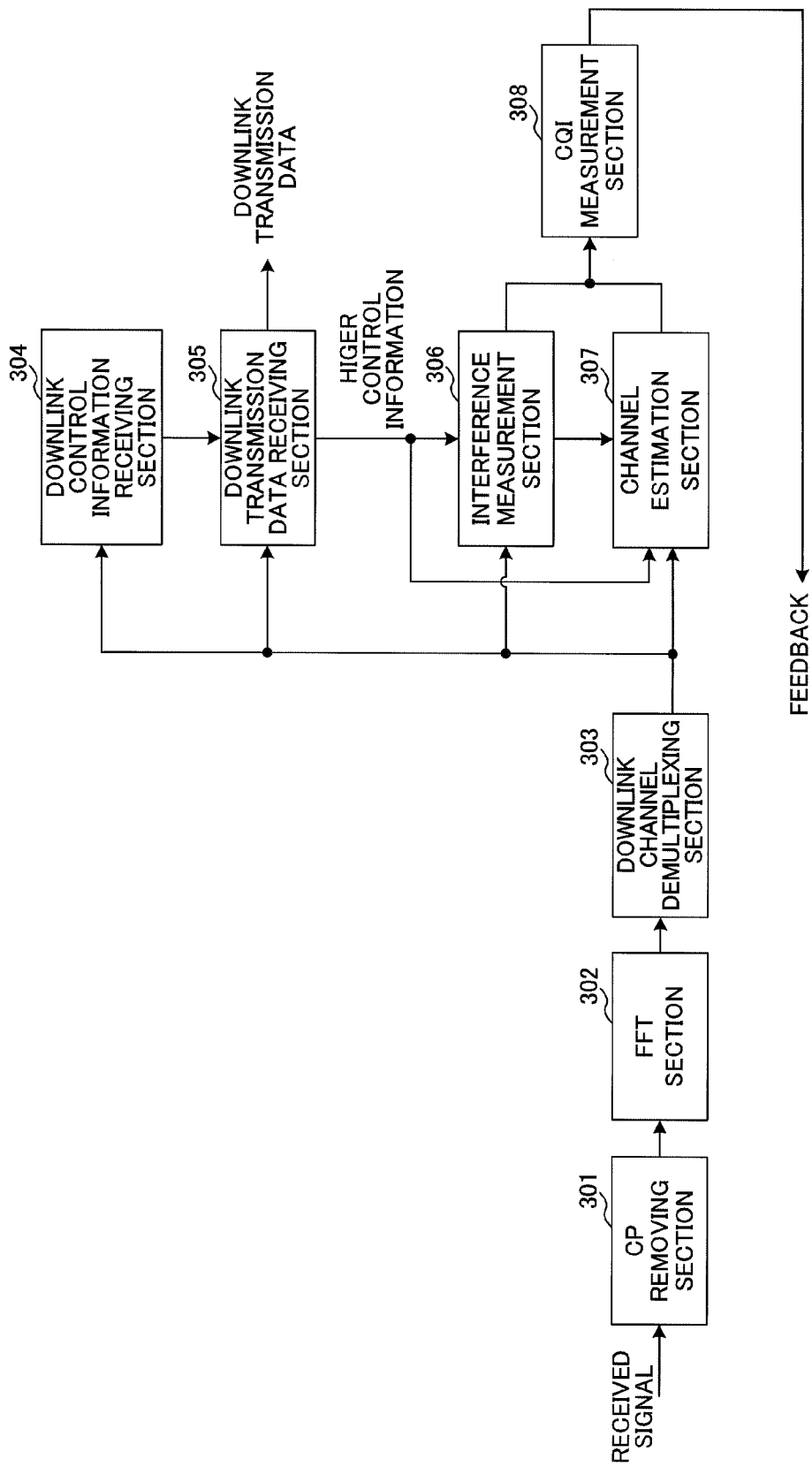
FIG. 18 is a functional block diagram of a mobile terminal apparatus.

The function blocks of a mobile terminal apparatus pertaining to the interference measurement process will be described with reference to FIG. 18. Note that the function blocks of FIG. 18 primarily relate to the baseband signal processing section 104 shown in FIG. 16. Although the function blocks shown in FIG. 18 are simplified to explain the present invention, assume that configurations which a baseband signal processing section should normally have are provided.

The mobile terminal apparatus 10 has, on the receiving side, a CP removing section 301, an FFT section 302, a downlink channel demultiplexing section 303, a downlink control information receiving section 304, a downlink transmission data receiving section 305, an interference measurement section 306, a channel estimation section 307, and a CQI measurement section 308.

A transmission signal that is transmitted from the base station apparatus 20 is received in the transmitting/receiving antenna 101 shown in FIG. 16, and output to the CP removing section 301. The CP removing section 301 removes the CPs from the received signal and outputs the signal to the FFT section 302. The FFT section 302 applies a fast Fourier transform (FFT) to the signal, from which the CPs have been removed, and converts the signal from a time domain signal to a frequency domain signal. The FFT section 302 outputs the signal converted into a frequency domain signal to the downlink channel demultiplexing section 303.

The downlink channel demultiplexing section 303 separates the downlink channel signal into downlink control information, downlink transmission data, and CSI-RSs. The downlink channel demultiplexing section 303 outputs the downlink control information to the downlink control information receiving section 304, outputs the downlink transmission data and higher control information to the downlink transmission data receiving section 305, and outputs the CSI-RSs to the channel estimation section 307.

The downlink control information receiving section 304 demodulates the downlink control information, and outputs the demodulated downlink control information to the downlink transmission data receiving section 305. The downlink transmission data receiving section 305 demodulates the downlink transmission data using the demodulated downlink control information. At this time, the downlink transmission data receiving section 305 specifies the CSI-RS resources based on CSI-RS pattern allocation information that has been reported implicitly, and specifies the muting resources based on muting information. The downlink transmission data receiving section 305 demodulates the user data excluding the CSI-RS resources and the muting resources. The downlink transmission data receiving section 305 outputs the higher control information included in the downlink transmission data, to the interference signal estimation section 306.

The interference measurement section 306 measures interference that is received from other transmission points in the CSI-RS resources based on the implicitly-reported CSI-RS pattern allocation information. For example, when the CSI-RS patterns shown in FIGS. 3 and 5 are reported, interference is measured in each resource of the CSI-RSs that are provided in high density. The CSI-RS transmitted from the connecting transmission point is subtracted from the combined received signal, and interference from other transmission points is measured. When the CSI-RS patterns shown in FIGS. 6 and 9 are reported, since additional CSI-RSs have zero power, signals that are received in the additional CSI-RS resources become interference components from other transmission points, on an as-is basis. The interference measurement section 306 measures interference in all the CSI-RS resources including the additional CSI-RSs, and finds the average measurement result in all the resource blocks. The averaged interference measurement results are reported to the CQI measurement section 308.

The channel estimation section 307 specifies the CSI-RS resources based on the implicitly-reported CSI-RS pattern allocation information. Then, the channel estimation section 307 measures channel states based on the CSI-RSs, and reports the channel estimation values to the CQI measurement section 308. The CQI measurement section 308 calculates CQIs based on the interference measurement results reported from the interference measurement section 306, the channel estimation results reported from the channel estimation section 307, and the feedback mode. When the CSI-RS patterns shown in FIG. 3 are applied, CSI-RSs that can be used in channel state measurements and interference measurements double, so that the accuracy of channel state measurements and the accuracy of interference measurements are improved. Even when additional CSI-RSs have zero power as in the CSI-RS patterns shown in FIGS. 6 and 9, the number of CSI-RS resources that are subject to interference measurements increases, so that the accuracy of interference measurements is improved. Note that, as for the feedback mode, any one of wideband CQI, subband CQI, and best-M average may be set. The CQIs calculated in the CQI measurement section 308 are reported to the base station apparatus 20 as feedback information.

The present invention is by no means limited to the above embodiment and can be implemented in various modifications. For example, it is possible to adequately change the positions to set CSI-RSs, the positions to set muting, the number of processing sections, the process steps, the number of CSI-RSs, the number of muting, the number of antennas and so on in the above description, without departing from the scope of the present invention. Besides, the present invention can be implemented with various changes, without departing from the scope of the present invention.

The disclosure of Japanese Patent Application No. 2012-199396, filed on Sep. 11, 2012, including the specification, drawings, and abstract, is incorporated herein by reference in its entirety.

The invention claimed is:

1. A radio communication system comprising a plurality of base station apparatuses that transmit a first reference signal for channel state measurement, and a first mobile terminal apparatus and a second mobile terminal apparatus that each connects with one of the plurality of base station apparatuses, wherein:

each base station apparatus comprises a reference signal allocation section that allocates the first reference signal to a first resource element in a reference signal resource defined for transmission of the first reference signal and also allocates a second reference signal for interference measurement to a second resource element in the reference signal resource, and implicitly reports allocation patterns of the first reference signal and the second reference signal to the first mobile terminal apparatus that supports both the first reference signal and the second reference signal; and each mobile terminal apparatus comprises an interference measurement section that measures interference using both the first reference signal and the second reference signal or using the second reference signal alone, based on the allocation patterns reported implicitly from the base station apparatus, wherein the reference signal allocation section allocates, as the second reference signal, a reference signal for both channel state measurement and interference measurement to the second resource element, based on the allocation pattern of the first reference signal that the second mobile terminal apparatus supports, and the first mobile terminal apparatus measures channel states and interference using the second reference signal.

2. A base station apparatus, to which a plurality of mobile terminal apparatuses connect, wherein the base station apparatus comprises a reference signal allocation section that allocates a first reference signal to a first resource element in a reference signal resource defined for transmission of the first reference signal and also allocates a second reference signal for interference measurement to a second resource element in the reference signal resource, and implicitly reports allocation patterns of the first reference signal and the second reference signal to a first mobile terminal apparatus that supports both the first reference signal and the second reference signal, wherein the reference signal allocation section allocates, as the second reference signal, a reference signal for both channel state measurement and interference measurement to the second resource element, based on the allocation pattern of the first reference signal that the second mobile terminal apparatus supports, and the first mobile terminal apparatus measures channel states and interference using the second reference signal.

3. A mobile terminal apparatus that connects with a base station apparatus, the mobile terminal apparatus comprising: an interference measurement section that, based on an allocation pattern of a first reference signal for channel state measurement and an allocation pattern of a second reference signal for interference measurement, allocated to a reference signal resource defined for transmission of the first reference signal, the allocation patterns being reported implicitly from the base station apparatus, measures interference using both the first reference signal and the second reference signal or using the second reference signal alone, wherein, as the second reference signal, a reference signal for both channel state measurement and interference measurement is allocated to a resource element in the reference signal resource, based on an allocation pattern of the first reference signal that another mobile terminal apparatus supports, and the interference measurement section measures channel states and interference using the second reference signal.

4. An interference method comprising the steps of:

allocating a first reference signal to a first resource element in a reference signal resource defined for transmission of the first reference signal for channel state measurement and also allocating a second reference signal for interference measurement to a second resource element in the reference signal resource;

implicitly reporting allocation patterns of the first reference signal and the second reference signal to a first mobile terminal apparatus that supports both the first reference signal and the second reference signal; and measuring interference using both the first reference signal and the second reference signal or using the second reference signal alone, in the first mobile terminal apparatus, based on the implicitly reported allocation patterns, wherein, as the second reference signal, a reference signal for both channel state measurement and interference measurement is allocated to the second resource element, based on an allocation pattern of the first reference signal that a second mobile terminal apparatus supports, and the first mobile terminal apparatus measures channel states and interference using the second reference signal.

5. A radio communication system comprising a plurality of base station apparatuses that transmit a first reference signal for channel state measurement, and a first mobile terminal apparatus and a second mobile terminal apparatus that each connects with one of the plurality of base station apparatuses, wherein:

each base station apparatus comprises a reference signal allocation section that allocates the first reference signal to a first resource element in a reference signal resource defined for transmission of the first reference signal and also allocates a second reference signal for interference measurement to a second resource element in the reference signal resource, and implicitly reports allocation patterns of the first reference signal and the second reference signal to the first mobile terminal apparatus that supports both the first reference signal and the second reference signal; and each mobile terminal apparatus comprises an interference measurement section that measures interference using both the first reference signal and the second reference signal or using the second reference signal alone, based on the allocation patterns reported implicitly from the base station apparatus, wherein the reference signal allocation section allocates as the second reference signal, a reference signal for dedicated use in interference measurement to the second resource element, based on the allocation pattern of the first reference signal which the second mobile terminal apparatus supports, and the first mobile terminal apparatus measures interference using the first reference signal and the reference signal for dedicated use in interference measurement.

6. A base station apparatus, to which a plurality of mobile terminal apparatuses connect, wherein the base station apparatus comprises a reference signal allocation section that allocates a first reference signal to a first resource element in a reference signal resource defined for transmission of the first reference signal and also allocates a second reference signal for interference measurement to a second resource element in the reference signal resource, and implicitly reports allocation patterns of the first reference signal and the second reference signal to a first mobile terminal apparatus that supports both the first reference signal and the second reference signal, wherein the reference signal allocation section allocates, as the second reference signal, a reference signal for dedicated use in interference measurement to the second resource element, based on the allocation pattern of the first reference signal which the second mobile terminal apparatus supports, and the first mobile terminal apparatus measures interference using the first reference signal and the reference signal for dedicated use in interference measurement.

7. A mobile terminal apparatus that connects with a base station apparatus, the mobile terminal apparatus comprising: an interference measurement section that, based on an allocation pattern of a first reference signal for channel state measurement and an allocation pattern of a second reference signal for interference measurement, allocated to a reference signal resource defined for transmission of the first reference signal, the allocation patterns being reported implicitly from the base station apparatus, the measures interference using both the first reference signal and the second reference signal or using the second reference signal alone, wherein, as the second reference signal, a reference signal for dedicated use in interference measurement is allocated to a resource element in the reference signal resource, based on the allocation pattern of the first reference signal which another mobile terminal apparatus supports, and the interference measurement section measures interference using the first reference signal and the reference signal for dedicated use in interference measurement.

8. An interference method comprising the steps of:

allocating a first reference signal to a first resource element in a reference signal resource defined for transmission of the first reference signal for channel state measurement and also allocating a second reference signal for interference measurement to a second resource element in the reference signal resource;

implicitly reporting allocation patterns of the first reference signal and the second reference signal to a first mobile terminal apparatus that supports both the first reference signal and the second reference signal; and measuring interference using both the first reference signal and the second reference signal or using the second reference signal alone, in the first mobile terminal apparatus, based on the implicitly reported allocation patterns, wherein, as the second reference signal, a reference signal, for dedicated use in interference measurement is allocated to the second resource element, based on the allocation pattern of the first reference signal which a second mobile terminal apparatus supports, and the first mobile terminal apparatus measures interference using the first reference signal and the reference signal for dedicated use in interference measurement.

* * * * *